(12) United States Patent
Taniguchi et al.

(10) Patent No.: US 7,702,472 B2
(45) Date of Patent: Apr. 20, 2010

(54) ROLLING BEARING DEVICE WITH SENSOR

(75) Inventors: Manabu Taniguchi, Kashihara (JP); Hirochika Ueyama, Hirakata (JP); Nobutsuna Motohashi, Katsuragi (JP); Tadashi Fukao, Kashiba (JP); Yasutaka Miyagawa, Habikino (JP); Kenji Ooiso, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 167 days.

(21) Appl. No.: 12/149,342

(22) Filed: Apr. 30, 2008

(65) Prior Publication Data

US 2008/0275656 A1    Nov. 6, 2008

(30) Foreign Application Priority Data

May 1, 2007  (JP) ............................. 2007-120987
May 1, 2007  (JP) ............................. 2007-120988

(51) Int. Cl.
*G01L 1/00*   (2006.01)

(52) U.S. Cl. ...................................................... 702/41

(58) Field of Classification Search ............. 702/41–44; 73/862.321, 862.322, 862.325; 384/448
See application file for complete search history.

(56) References Cited

U.S. PATENT DOCUMENTS 7,568,842 B2 *   8/2009   Gempper et al. ............ 384/448

FOREIGN PATENT DOCUMENTS

| JP | 2001-21577 | 1/2001 |
| JP | 2005-99003 | 4/2005 |

* cited by examiner

*Primary Examiner*—Drew A Dunn
*Assistant Examiner*—Stephen J Cherry
(74) *Attorney, Agent, or Firm*—McGinn IP Law Group, PLLC

(57) ABSTRACT

A rolling bearing device with a sensor includes a rotational component estimator that extracts a rotational synchronization component included in the rotation of an inner shaft relative to an outer ring from each of a signal output by a first displacement detector and a signal output by a second displacement detector. The rotational component estimator performs rotational operation and integration operation.

5 Claims, 33 Drawing Sheets

FIG. 31
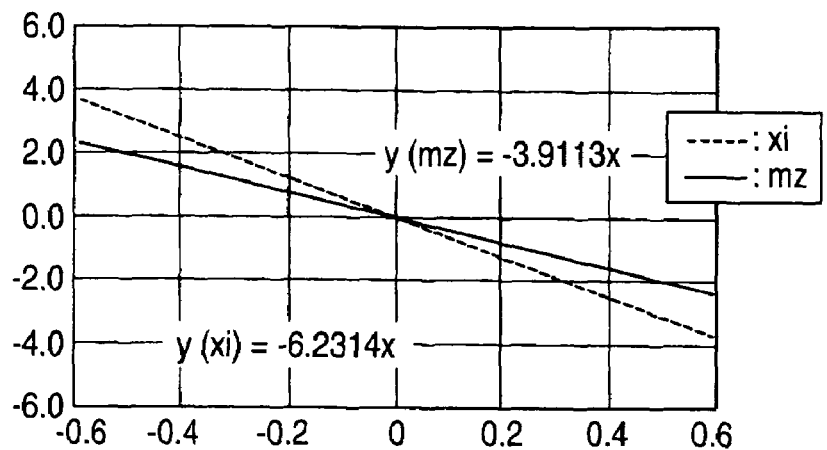
FIG. 32
$$\begin{pmatrix} k_z = y_{(xi)} / y_{(mz)} \\ k_x = y_{(zi)} / y_{(mx)} \end{pmatrix}$$
FIG. 33
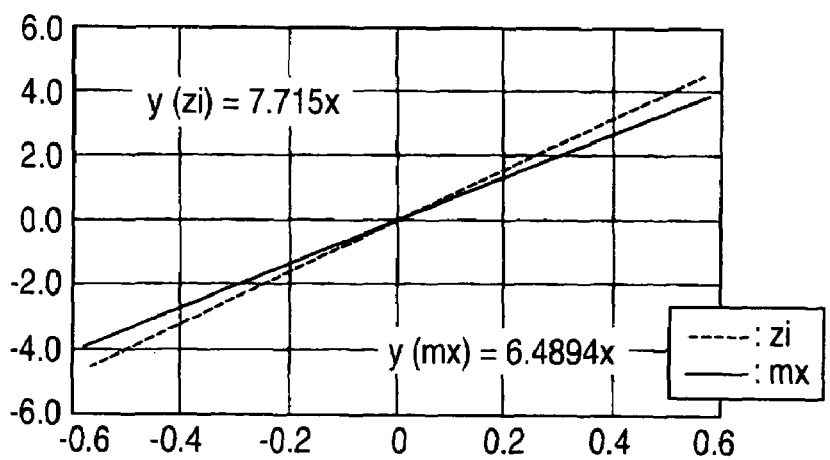

FIG. 36

SIGNAL OF EACH SECTION IN ROTATIONAL COMPONENT ESTIMATOR
(WHEN PHASE DIFFERENCE IS $\pi/4$)

ROLLING BEARING DEVICE WITH SENSOR

BACKGROUND OF THE INVENTION

The invention relates to a rolling bearing device with a sensor having raceway members, rolling elements, and a sensor unit, and particularly, to a hub unit having a sensor unit.

Conventionally, as a rolling bearing device with a sensor, there is a hub unit described in Japanese Unexamined Patent Application Publication No. 2001-21577.

This hub unit includes a rotating raceway ring, a fixed raceway ring, and one displacement sensor, and the displacement sensor is provided in the fixed raceway ring. Specifically, an outer peripheral surface of the fixed raceway ring has a hole that extends radially, and the displacement sensor is inserted into the hole. A detection surface of the displacement sensor is directed to an outer peripheral surface of the rotating raceway ring.

The displacement sensor detects a gap between the rotating raceway ring and the fixed raceway ring that changes depending on any displacement of the outer peripheral surface of the rotating raceway ring to be generated when a load acts on a wheel of a vehicle (specifically, an electric signal that changes in response to this gap). The hub unit calculates a vertical load that acts on the wheel on the basis of a gap detected by the displacement sensor.

In the conventional rolling bearing device with a sensor, the conventional displacement sensor is one, and the detection surface of the displacement sensor is directed to the outer peripheral surface of the rotating raceway ring. Therefore, there is a problem in that it is possible to find a translational load that vertically acts on the wheel on the basis of a detection value of a displacement sensor, whereas it is impossible to find a moment load in a front-back direction of the vehicle, a moment load in a vertical direction of the vehicle, and a translational load in an axial direction of the wheel, which are generated with a centrifugal force at the time of the turning driving or the like of the vehicle.

Further, the request for improve the sensitivity of the sensor unit to precisely measure the load applied to a rolling bearing exists in the rolling bearing device with a sensor.

Further, in a hub unit, there has conventionally been a request for easily and precisely detecting the translational load in the vertical direction of the vehicle, the translational load in the traveling direction of the vehicle, the translational load in the axial direction of the wheel, the moment load around the vertical direction of the vehicle, and the moment load around the traveling direction of the vehicle.

SUMMARY OF THE INVENTION

Thus, the object of the invention is to provide a rolling bearing device with a sensor capable of easily and precisely detecting the translational load and moment load of a displacement-detected portion. Further, another object of the invention is to provide a rolling bearing device with a sensor capable of easily and precisely detecting, particularly, a translational load in a vertical direction of a vehicle, a translational load in a traveling direction of the vehicle, a translational load in an axial direction of the wheel, a moment load around the vertical direction of the vehicle, and a moment load around the traveling direction of the vehicle.

In order to achieve the object, the present invention provides the following arrangements.

(1) A Rolling Bearing Device with a Sensor Comprising:
  a first raceway member including a peripheral surface having a raceway surface;
  a second raceway member including a peripheral surface having a raceway surface and an annular displacement-detected portion;
  rolling elements arranged between the raceway surfaces of the first and second raceway-members;
  a sensor unit that detects radial displacement and axial displacement of the displacement-detected portion; and
  a calculator,
  wherein the sensor unit includes:
  a first displacement detector including a detection surface that radially faces the displacement-detected portion;
  a second displacement detector located at a distance axially from the first displacement detector, and including a detection surface that radially faces the displacement-detected portion,
  wherein the first displacement detector and the second displacement detector substantially axially overlap each other, and each of the first displacement detector and the second displacement detector includes four displacement sensors arranged at substantially regular intervals in a circumferential direction,
  wherein the calculator calculates translational loads that act on the displacement-detected portion, and moment loads that act on the displacement-detected portion on the basis of
    fi−ri,
    ti−bi,
    fo−ro,
    to−ro, and
  a value that is obtained by subtracting from an output of one sensor of the first displacement detector an output of one sensor of the second displacement detector that substantially overlaps the one sensor axially, or a value that is obtained by subtracting from the sum of outputs of a plurality of sensors of the first displacement detector the sum of outputs of a plurality of sensors of the second displacement detector that substantially overlap the plurality of sensors axially,
  where outputs of the four sensors of the first displacement detector are represented by fi, ri, ti, and bi, respectively, and outputs of the four sensors of the second displacement detector are represented by fo, ro, to, and bo, respectively, and
  where fi and ri are outputs of two sensors of the first displacement detector located substantially line-symmetrically with respect to a central axis of the second raceway member, ti and bi are outputs of the other two sensors of the first displacement detector located substantially line-symmetrically with respect to the central axis of the second raceway member, fo is an output of a sensor that substantially overlaps the sensor outputting fi axially, ro is an output of a sensor that substantially overlaps the sensor outputting ri axially, to is an output of a sensor that substantially overlaps the sensor outputting ti axially, and bo is an output of a sensor that substantially overlaps the sensor outputting bi axially.

(2) The Rolling Bearing Device According to (1),
  wherein the second raceway member includes a wheel-attaching flange for attaching a wheel of a vehicle, and the first raceway member includes a body-attaching flange for attaching a body of the vehicle,
  wherein the raceway surface of the first raceway member is located radially outside the raceway surface of the second raceway member,
  wherein, in a state where the second raceway member is arranged in a predetermined position, a detection surface of the sensor outputting fi radially faces a portion of the displacement-detected portion that is located substantially on a front side of the vehicle, a detection surface of the sensor outputting ri radially faces a portion of the displacement-detected portion that is located substantially on a rear side of the vehicle, a detection surface of the sensor outputting ti radially faces a portion of the displacement-detected portion that is located substantially on a vertical top side of the vehicle, and a detection surface of the sensor outputting bi radially faces a portion of the displacement-detected portion that is located substantially on a vertical bottom side of the vehicle, and wherein the calculator calculates a translational load in a vertical direction of the vehicle, a translational load in a traveling direction of the vehicle, a translational load in an axial direction of the wheel, a moment load around the vertical direction of the vehicle, and a moment load around the traveling direction of the vehicle, based on fi−ri, ti−bi, fo−ro, to−ro, (fi+ri+ti+bi−(fo+ro+ to+bo)) and twenty-five constants.

(3) The Rolling Bearing Device According to (1), wherein the second raceway member includes a wheel-attaching flange for attaching a wheel of a vehicle, and the first raceway member includes a body-attaching flange for attaching a body of the vehicle, wherein the raceway surface of the first raceway member is located radially outside the raceway surface of the second raceway member, wherein, in a state where the second raceway member is arranged in a predetermined position, a detection surface of the sensor outputting fi radially faces a portion of the displacement-detected portion that is located substantially on the front side of the vehicle, a detection surface of the sensor outputting ri radially faces a portion of the displacement-detected portion that is located substantially on the rear side of the vehicle, a detection surface of the sensor outputting ti radially faces a portion of the displacement-detected portion that is located substantially on the vertical top side of the vehicle, and a detection surface of the sensor outputting bi radially faces a portion of the displacement-detected portion that is located substantially on the vertical bottom side of the vehicle, and wherein the calculator calculates Fx, Fy, Fz, Mz and Mx based on (i) four values selected from [fi−ri, ti−bi, fo−ro, to−ro and (fi+ri+ti+bi−(fo+ro+to+bo))], (ii) sixteen constants, and (iii) a relational expression Fy=Mx/R, where a radius of the wheel is represented by R[m], a translational load in a vertical direction of the vehicle is represented by Fz[N], a translational load in a traveling direction of the vehicle is represented by Fx[N], a translational load in an axial direction of the wheel is represented by Fy[N], a moment load around the vertical direction of the vehicle is represented by Mz[N−m], and a moment load around the traveling direction of the vehicle is represented by Mx[N·m].

(4) The Rolling Bearing Device According to (1), wherein the sensor unit includes:

a rotation-signal extractor that extracts a rotational synchronization component included in the rotation of the second raceway member relative to the first raceway member based on each of a signal output by the first displacement detector and a signal output by the second displacement detector; and a displacement signal calculator that calculates a signal associated with the displacement of the displacement-detected portion based on an output of the first displacement detector, an output of the second displacement detector, and an output of the rotation-signal extractor.

(5) The Rolling Bearing Device According to (4), wherein the first displacement detector and the second displacement detector substantially axially overlap each other, and each of the first displacement detector and the second displacement detector includes four displacement sensors arranged at substantially regular intervals in the circumferential direction, wherein the sensor unit includes an orthogonal component calculator that calculates, based on a signal of the first displacement detector and a signal of the second displacement detector, a first displacement signal representing the displacement of the displacement-detected portion on a first axis that extends radially, and a second displacement signal representing the displacement of the displacement-detected portion on a second axis that is orthogonal to the first axis and extends radially, and wherein the rotation-signal extractor includes:

a first calculator that converts the first displacement signal and the second displacement signal into two signals in a first rotating coordinate system that rotates at the same rotational speed as the rotational speed of the second raceway member relative to the first raceway member, and that is composed of two axes that extend radially and are orthogonal to each other;

a second calculator that performs time integration on each of the two signals output by the first calculator to output two signals; and a third calculator that converts the two signals output by the second calculator into two signals in a second rotating coordinate system that rotates in a direction opposite to the first rotating coordinate system at same rotational speed as the first rotating coordinate system and that is composed of two axes that extend radially and are orthogonal to each other.

BRIEF DESCRIPTION OF THE DRAWINGS

FIG. 31 is a view showing the relationship between Mz, and displacement detection values of mz and xi in a case where only the moment load Mz around the z-axis is made to act.

FIG. 32 is a view for explaining a correction coefficient.

FIG. 33 is a view showing the relationship between Mx, and displacement detection values of mx and zi in a case where only the moment load Mx around the x-axis is made to act.

FIG. 36 is a matrix diagram showing the correspondence relationship between independent variables sFx, sFy, sFz, sMx, and sMz, and Fx, Fy, Fz, Mx, and Mz that are actual loads that act on the wheel.

DETAILED DESCRIPTION OF PREFERRED EMBODIMENTS

Hereinafter, the invention will be explained in detail according to illustrated embodiments.

First Embodiment

Figure 1:
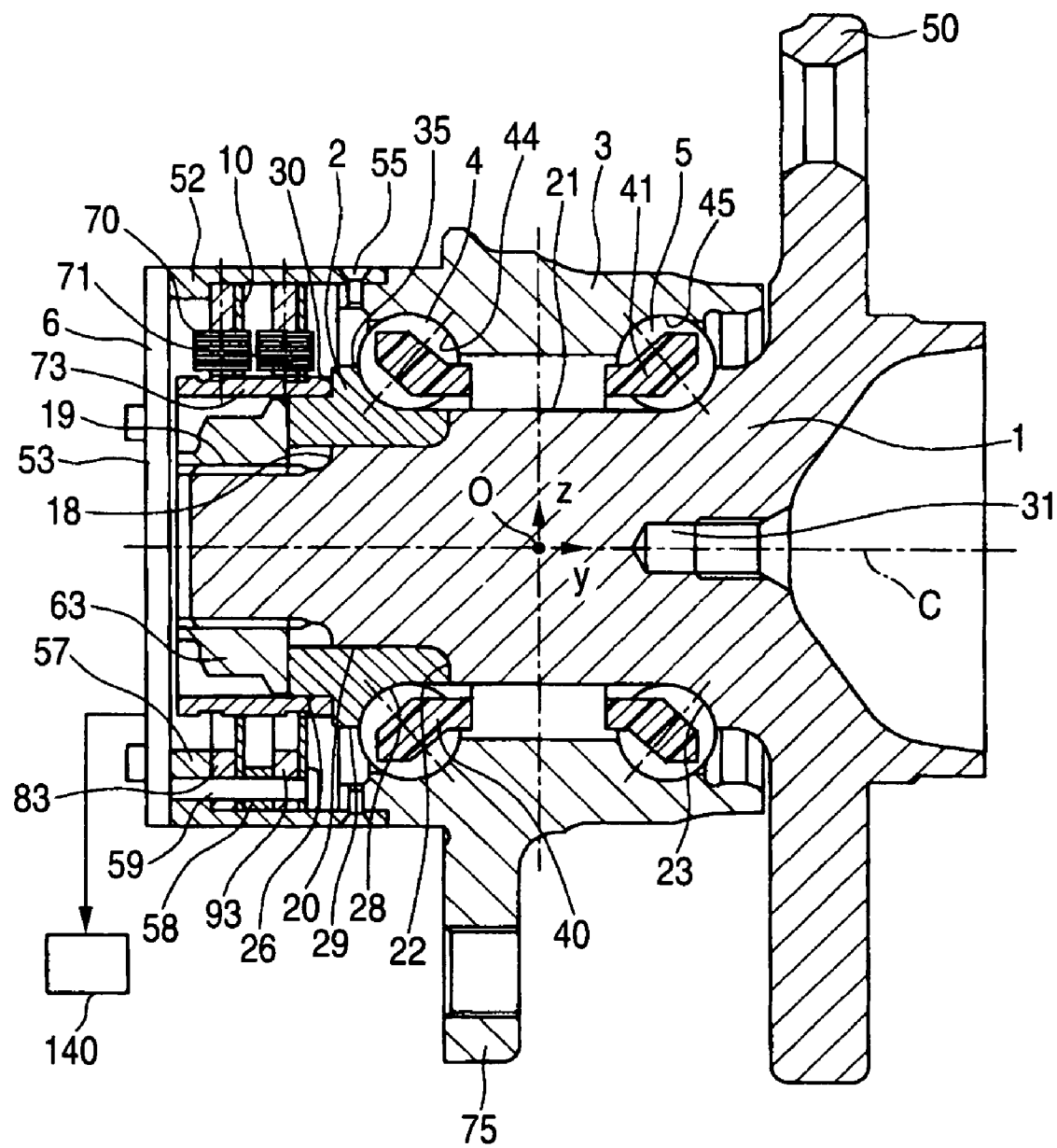
FIG. 1 is an axial sectional view of a rolling bearing device with a sensor of a hub unit according to a first embodiment of the invention.

FIG. 1 is an axial sectional view of a rolling bearing device with a sensor of a hub unit according to a first embodiment of the invention.

The hub unit includes an inner shaft 1, an inner ring 2, an outer ring 3 serving as a first raceway member, a plurality of first balls 4 serving as rolling elements, a plurality of second balls 5 serving as rolling elements, a case member 6, and a sensor unit 10.

The inner shaft 1 has a small-diameter shaft portion 19, a middle-diameter shaft portion 20, and a large-diameter shaft portion 21 serving as a second shaft portion. An outer peripheral surface of the small-diameter shaft portion 19 is formed with a thread. The middle-diameter shaft portion 20 is connected to the small-diameter shaft portion 19 via a stepped portion 18, and has a larger external diameter than the external diameter of the small-diameter shaft portion 19. The large-diameter shaft portion 21 is located on the side of the middle-diameter shaft portion 20 opposite the small-diameter shaft portion 19. The large-diameter shaft portion 21 is connected to the middle-diameter shaft portion 20 via a stepped portion 22, and has a larger external diameter than the external diameter of the middle-diameter shaft portion 20. The outer peripheral surface of the large-diameter shaft portion 21 has an angular raceway groove 23 serving as a raceway surface, and the external diameter of the raceway groove 23 becomes large as being separated from the middle-diameter shaft portion 20.

The inner shaft 1 has a center hole 31. The center hole 31 is formed in a radial central portion of an axial end surface of the inner shaft 1 on the side of the large-diameter shaft portion 21. The center hole 31 has a cylindrical portion, and extends by a predetermined distance axially. Further, the inner shaft 1 has a rotor-attaching flange 50 (or wheel-attaching flange) for attaching a rotor (or wheel) (not shown) to an axial end thereof on the side of the large-diameter shaft portion 21.

The inner ring 2 is externally fitted and fixed to an outer peripheral surface of the middle-diameter shaft portion 20 of the inner shaft 1. An axial end surface of the inner ring 2 on the side of the large-diameter shaft portion 21 abuts on-the-stepped portion 22. The inner ring 2 has an angular raceway groove 28 serving as a raceway surface in its outer peripheral surface on the side of the large-diameter shaft portion 21. The external diameter of the raceway groove 28 becomes large as being separated from the large-diameter shaft portion 21. An axial portion of an outer peripheral surface of the inner ring 2 opposite the large-diameter shaft portion 21 has a cylindrical outer peripheral surface 26, and the cylindrical outer peripheral surface 26 is connected to a raceway shoulder 29 of the raceway groove 28, which is located opposite the large-diameter shaft portion 21, via a stepped portion 30. The raceway shoulder 29 has a cylindrical outer peripheral surface 35. The external diameter of the cylindrical outer peripheral surface 26 located at the axial end of the outer peripheral surface of the inner ring 2 is made smaller than the external diameter of the cylindrical outer peripheral surface 35 of the raceway shoulder 29.

The axial end surface of the inner ring 2 on the side of the large-diameter shaft portion 21 abuts on the stepped portion 22. As shown in FIG. 1, a nut 63 is screwed to the thread of the small-diameter shaft portion 19. An axial end surface of the inner ring 2 opposite the large-diameter shaft portion 21 abuts on an axial end surface of the nut 63 on the side of the large-diameter shaft portion 21. By screwing the nut 63 toward the large-diameter shaft portion 21 in the axial direction by a predetermined distance, the inner ring 2 is firmly fixed to the inner shaft 1.

The outer ring 3 is located radially outside the large-diameter shaft portion 21. An inner peripheral surface of the outer ring 3 has an angular first raceway groove 44 serving as a raceway surface, and an angular second raceway groove 45 serving as a raceway surface. The outer ring 3 has a body-attaching flange 75 for fixation to a vehicle body. The plurality of first balls 4 are arranged at intervals from each other in a circumferential direction in a state where they are held by a first cage 40 between the raceway groove 28 of the inner ring 2, and the first raceway groove 44 of the outer ring 3, and the plurality of second balls 5 are arranged at intervals from each other in a state they are held by a second cage 41 between the raceway groove 23 of the inner shaft 1, and the second raceway groove 45 of the outer ring 3.

The case member 6 is constituted by a tubular member 52 and a disk-like lid member 53. An axial end of the tubular member 52 on the side of the outer ring 3 is fixed to an end of an outer peripheral surface of the outer ring 3 on the side of the small-diameter shaft portion 19 by locking screws 55. Meanwhile, the lid member 53 blocks an opening of the tubular member 52 opposite the outer ring. The lid member 53 prevents foreign matters from entering the rolling bearing device.

The sensor unit 10 has a first displacement detector 70, a second displacement detector 71, and a target member 73. The first and second displacement detectors 70 and 71 are fixed to an inner peripheral surface of the tubular member 52. Meanwhile, the target member 73 has a tubular shape. One axial end of the target member 73 is pressed into the cylindrical outer peripheral surface 26 of the inner ring 2 by press fitting. In other words, the one end of the target member 73 is externally fitted and fixed to the cylindrical outer peripheral surface 26 that is one end of the outer peripheral surface of the inner ring 2. The inner shaft 1, the inner ring 2, the nut 63, and the target member 73 constitute the second raceway member, and an outer peripheral surface of the target member 73 becomes a displacement-detected portion.

Figure 2:
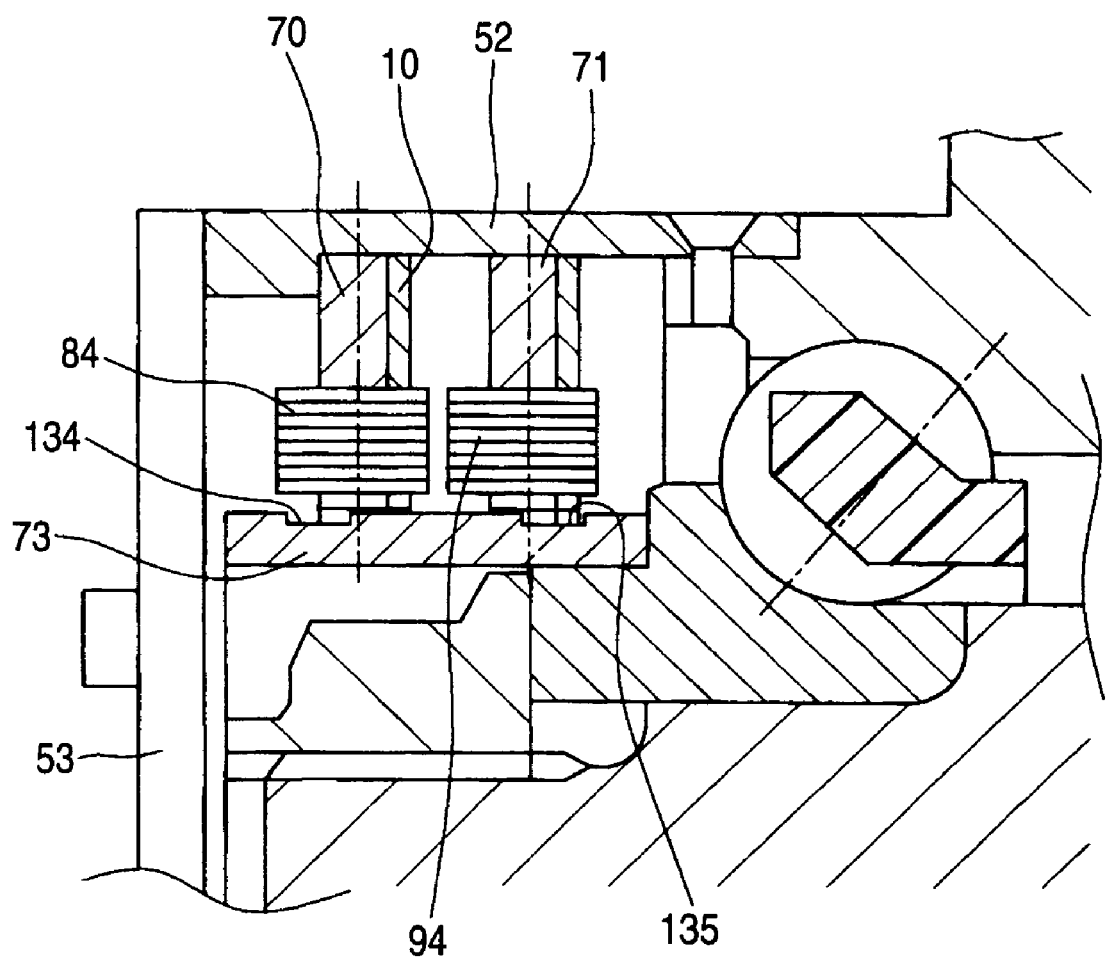
FIG. 2 is an enlarged sectional view around a first displacement detector in FIG. 1.
Figure 3:
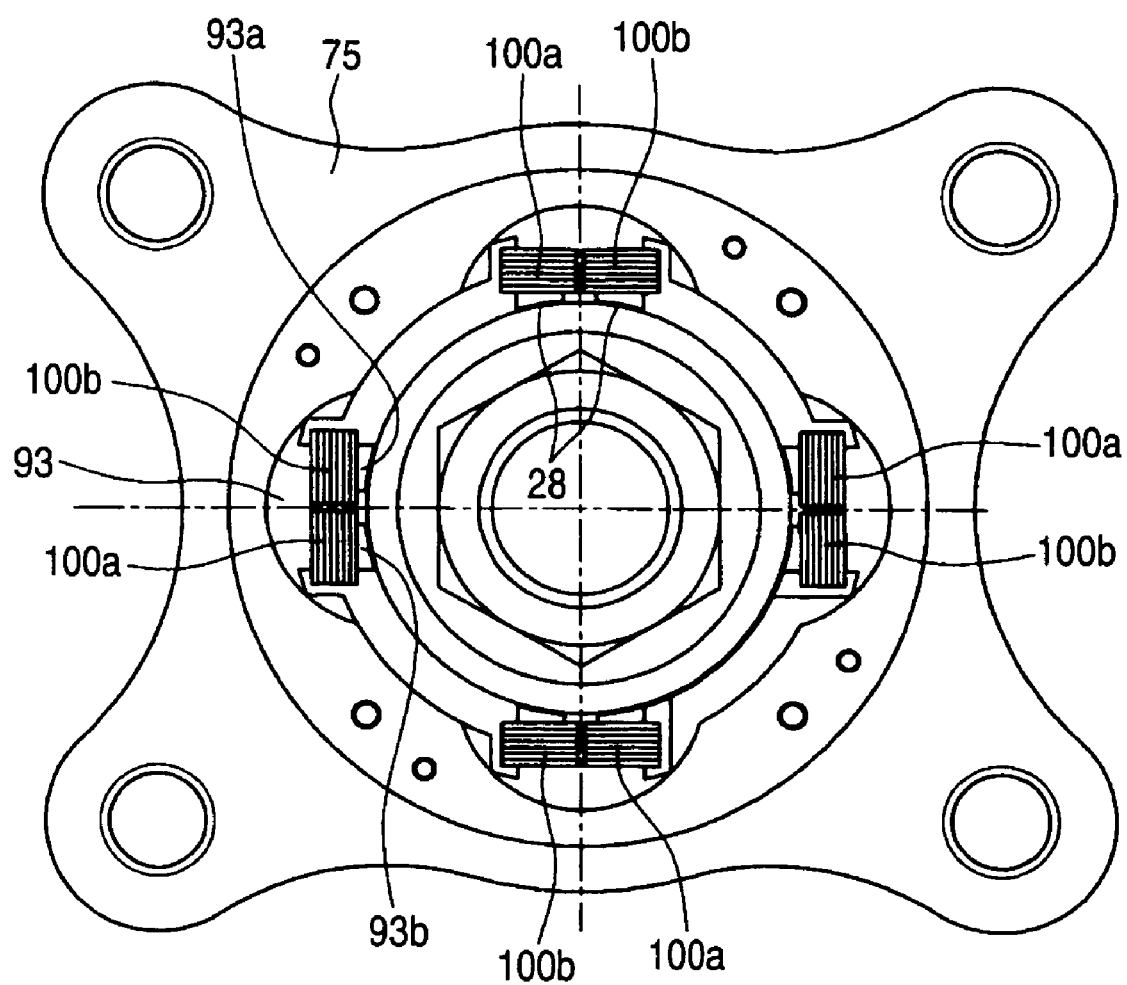
FIG. 3 is a view illustrating a circumferential arrangement configuration of four displacement sensors.

FIG. 2 is an enlarged sectional view around the first displacement detector 70 in FIG. 3.

As shown in FIG. 2, the second displacement detector 71 is located closer to a wheel (the rotor-attaching flange 50) than the first displacement detector 70. The first and second displacement detectors 70 and 71 are fixed to the inner peripheral surface of the tubular member 52. The first displacement detector 70 is the same as the second displacement detector 71, and the first displacement detector 70 is arranged at a distance axially from the second displacement detector 71. The first displacement detector 70 substantially overlaps the second displacement detector 71 axially.

As shown in FIG. 1, a sensor ring 83 and a sensor ring 93 are fixed to the inner peripheral surface of the tubular member 52. The sensor ring 83 and the sensor ring 93 are fixed to a flange 57 of the tubular member 52 by locking screws 59 with an annular spacer 58 interposed therebetween. The first displacement detector 70 has four displacement sensors 84 (refer to FIG. 2), and the second displacement detector 71 has four displacement sensors 94 (refer to FIG. 2). Each of the displacement sensors 84 extends radially inward from an inner peripheral surface of the sensor ring 83, while each of the displacement sensors 94 extends radially inward from an inner peripheral surface of the sensor ring 93.

The first displacement detector 70 and the second displacement detector 71 are fixed to the case member 6 via the sensor rings 83 and 93, respectively. Accordingly, only by fixing the case member 6 to the outer peripheral surface of the outer ring 3 as described above after the first displacement detector 70 and the second displacement detector 71 are fixed to the case member 6 via the sensor rings 83 and 93, the first and second displacement detectors 70 and 71 can be simply fixed to the hub unit. That is, it is not necessary to individually attach the displacement detectors 70 and 71 to the outer ring 3, and it is also not necessary to provide the outer ring 3 with an attachment structure, such as through-holes, for mounting the displacement detectors 70 and 71. Further, since the positions of the displacement detectors 70 and 71 relative to the case member 6 are determined in advance, the displacement detectors 70 and 71 with respect to the target member 73 can be exactly and easily positioned.

Although not shown in FIGS. 1 and 2, the four displacement sensors 84 are arranged at predetermined intervals in the circumferential direction in a radial inner portion of the sensor ring 83 (in the first embodiment, they are arranged at regular intervals in the circumferential direction), while the four displacement sensors 94 are arranged at predetermined intervals in the circumferential direction in a radial inner portion of the sensor ring 93 (in the first embodiment, they are arranged at regular intervals in the circumferential direction).

FIG. 3 is a view illustrating a circumferential arrangement configuration of the four displacement sensors 94. In addition, although not described, the four displacement sensors 94 also have the same circumferential arrangement structure as the four displacement sensors 84. Further, reference number 75 in FIG. 3 is a flange of the outer ring 3 denoted by 75 in FIG. 1.

As shown in FIG. 3, each of the displacement sensors 94 is composed of a coil element 100a and a coil element 100b that are arranged in proximity to each other in the circumferential direction, to make a pair. The four displacement sensors 94 are installed in a position that substantially radially faces the portion of the target member 73 that is located on the vertical topmost side, a position that substantially radially faces the portion of the target member 73 that is located on the vertical bottommost side, a position that substantially radially faces the foremost position of a vehicle to which a rolling bearing device is attached in the target member 73, and a position that substantially radially faces the rearmost position of the vehicle to which the rolling bearing device is attached in the target member 73, in a state where the rolling bearing device (hub unit in the first embodiment) is installed in a predetermined position. In addition, the four displacement sensors 84 substantially overlap the four displacement sensors 94 axially.

In each set, the coil element 100a and the coil element 100b that makes a pair have independent detection surfaces, and the coil element 100a and the coil element 100b that makes a pair are connected in series. The sensor ring 93 has a pair of magnetic poles 93a and 93b, which protrude radially inward, at its radial inner end. The coil element 100a is configured such that a coil is wound around the magnetic pole 93a, while the coil element 100b is configured such that a coil is wound around the magnetic pole 93b. In each of the magnetic pole 93a and the magnetic pole 93b, a radial inner end surface 28 is a detection surface. The detection surfaces radially face each other at a distance from the outer peripheral surface of the target member 73.

Hereinafter, in a state where the rolling bearing device (hub unit in the first embodiment) is installed in a predetermined position, a suffix "t" is added to a displacement sensor that substantially radially faces the portion of the target member 73 that is located on the vertical topmost side, a suffix "b" is added to a displacement sensor that substantially radially faces the portion of the target member 73 that is located on the vertical bottommost side, a suffix "f" is added to a displacement sensor that substantially radially faces the foremost position of a vehicle to which a rolling bearing device is attached in the target member 73, and a suffix "r" is added to a displacement sensor that substantially radially faces the rearmost position of the vehicle to which the rolling bearing device is attached in the target member 73.

Figure 4:
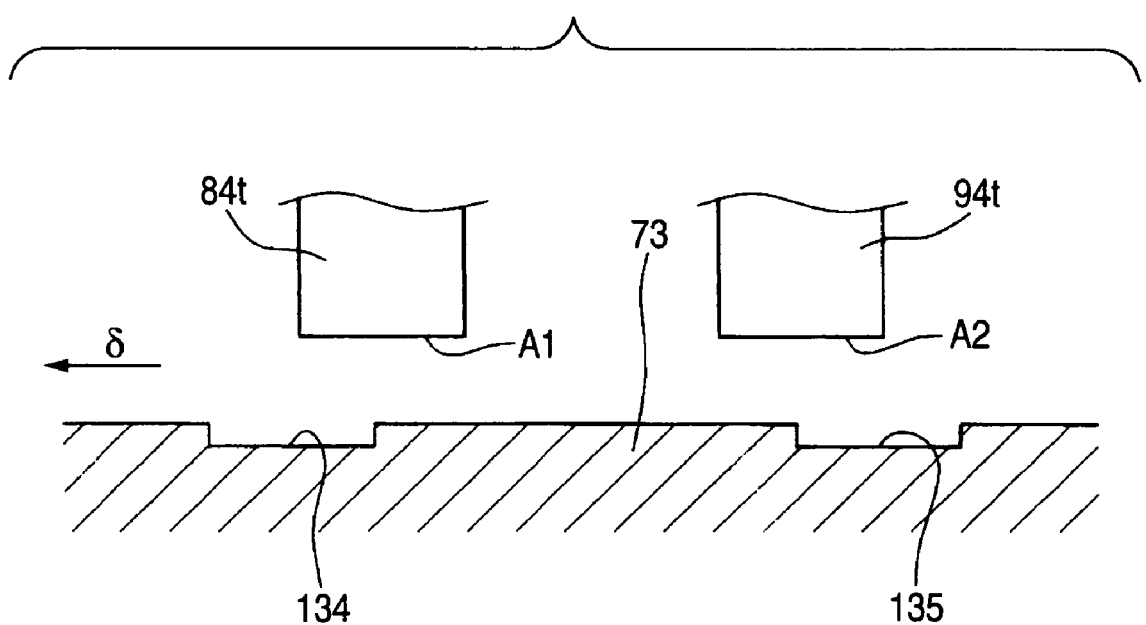
FIG. 4 is a view showing the positional relationship among detection surfaces of the displacement sensors, a first annular groove, and a second annular groove.

FIG. 4 is a view showing the positional relationship among a detection surface A1 of the displacement sensor 84t, a first annular groove 134 and a second annular groove 135.

As shown in FIG. 4, a displacement-detected portion that is an outer peripheral surface of the target member 73 has a first annular groove 134 and a second annular groove 135. The first annular groove 134 and the second annular groove 135 extend in the circumferential direction. The second annular groove 135 is located on the wheel side of the first annular groove 134 at a distance axially from the first annular groove 134.

In addition, although not described, the positional relationship among a detection surface of a displacement sensor 84b, a detection surface of a displacement sensor 94b, the first annular groove 134, and the second annular groove 135 is the same as the positional relationship among the detection surface A1 of the displacement sensor 84t, the detection surface A2 of the displacement sensor 94t, the first annular groove 134, and the second annular groove 135. In addition, the positional relationship among a detection surface of a displacement sensor 84f, a detection surface of a displacement sensor 94f, the first annular groove 134, and the second annular groove 135 is the same as the positional relationship among the detection surface A1 of the displacement sensor 84t, the detection surface A2 of the displacement sensor 94t, the first annular groove 134, and the second annular groove 135. In addition, the positional relationship among a detection surface of a displacement sensor 84r, a detection surface of a displacement sensor 94r, the first annular groove 134, and the second annular groove 135 is the same as the positional relationship among the detection surface A1 of the displacement sensor 84t, the detection surface A2 of the displacement sensor 94t, the first annular groove 134 and the second annular groove 135.

As shown in FIG. 4, in the axial direction, a central portion of the detection surface A1 substantially coincides with the edge of the first annular groove 134 on the side of the second annular groove 135, and a central portion of the detection surface A2 substantially coincides with the edge of the second annular groove 135 on the side of the first annular groove 134.

Supposing the target member 73 has been displaced by a distance 5 toward the lid member 53 axially from this state, the axial lap length (axial overlapping length) between the detection surface A1 and the first annular groove 134 decreases, while the axial lap length (axial overlapping length) between the detection surface A2 and the second annular groove 135 increases. From this, a displacement detection value of a gap of a displacement sensor 84 decreases, while a displacement detection value of a gap of a displacement sensor 94 increases. If the target member 73 is axially displaced in this way, a difference is caused between a displacement detection value to be detected by the displacement sensor 84t, and a displacement detection value to be detected by the displacement sensor 94t.

In a case where the target member 73 has moved axially, the axial positions of the first annular groove 134 and the second annular groove 135 with respect to the displacement sensors 84t and 94t are set so that the displacement detection values to be detected by the displacement sensor 84t and the displacement sensor 94t may be changed in positive/negative opposite directions. By taking a difference between the displacement detection value of the displacement sensor 84t, and the displacement detection value of the displacement sensor 94t, the axial translational amount (this is an axial displacement, and has a correlation with a translational load) of the inner ring 2 (inner shaft 1) is detected.

By taking differences (differences between displacement detection values of displacement sensors having the same suffix) between displacement detection values of the displacement sensors 84t, 84b, 84f, and 84r on the center side (hereinafter referred to as "inner side") of the vehicle, and displacement detection values of the displacement sensors 94t, 94b, 94f, and 94r on the wheel side (hereinafter referred to as "outer side"), the displacement detection value of the second raceway member to an axial unit translational amount is amplified. This can enhance the detection sensitivity of the axial displacement of the sensor unit 10.

In addition, contrary to the device shown in FIG. 4, the first annular groove on the inner side may be shifted to the outer side from the detection surface of the first displacement detector, and the second annular groove on the outer side may be shifted to the inner side from the detection surface of the second displacement detector. Even in this case, the same operational effects as the above ones can be obtained.

Figure 5:
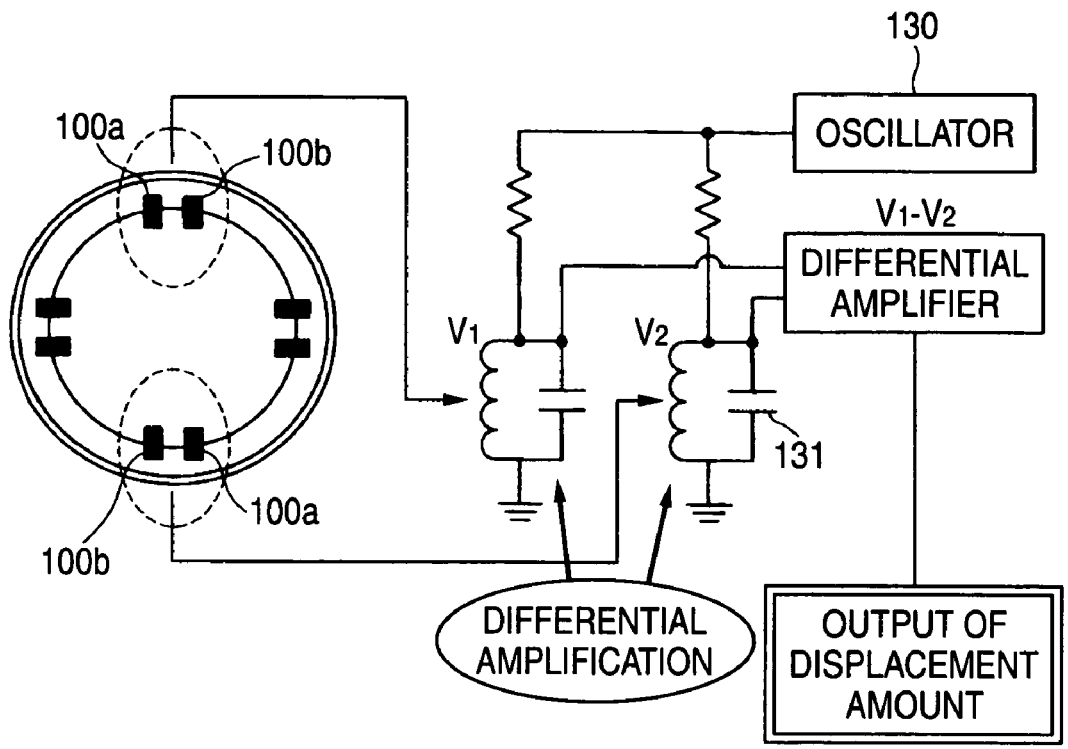
FIG. 5 is a view showing an example of a gap detecting circuit connected to a sensor body.

FIG. 5 is a view showing an example of a gap detecting circuit connected to each of the first displacement detector 70 and the second displacement detector 71.

As shown in FIG. 5, in each of the first displacement detector 70 and the second displacement detector 71, two sets of coil elements 100a and coil elements 100b that are located in the vertical direction are connected to an oscillator 130. An alternating current during a fixed period is supplied to the two sets of coil elements 100a and coil elements 100b from the oscillator 130. A synchronizing capacitor 131 is connected in parallel to the two sets of coil elements 100a and the coil elements 100b.

Also, output voltages (detection values) of one set of coil element 100a and coil element 100b and the other set of coil element 100a and coil element 100b are input to a differential amplifier 132, and are taken as output voltages (detection values) corresponding to the above same straight direction, so that a temperature drift may be eliminated. In addition, although not shown, a temperature drift in the other two sets of coil elements 100a and coil elements 100b that are located in a front-back direction is also eliminated by taking a difference by a differential amplifier similarly to the above. The gap detecting circuit shown in FIG. 5 becomes an example of an orthogonal component calculator. In this example, a first axis corresponds to the vertical direction and the second axis corresponds to the front-back direction.

In each of the displacement sensors 84 and 94, if the inductance of the coil element 100a (or coil element 100b) is defined as "L", the area of a detection surface is defined as "A", permeability is defined as "$\mu$", the number of turns of a coil is defined as "N", and the distance (gap) from the detection surface to the target member 73 is defined "d", the following Expression (a) is satisfied.

$$L = A \times \mu \times N^2 / d \quad (a)$$

If the gap d to the target member 73 changes, the inductance L of each of the displacement sensors 84 and 94 changes, and the output voltages change. Accordingly, by detecting changes in the output voltages, the radial gap from the detection surface of each of the displacement sensors 84 and 94 to the target member 73 can be detected.

Figure 6:
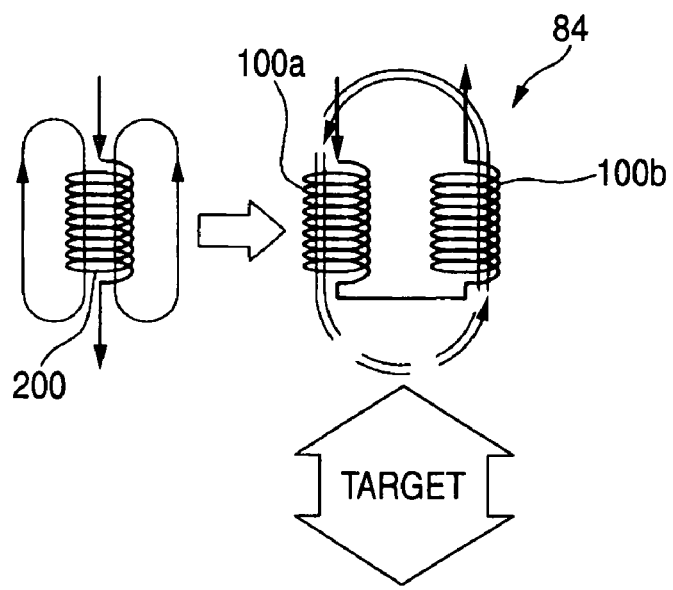
FIG. 6 is a view for explaining that the magnetic flux density to be generated in the displacement sensors used in the first embodiment can be increased as compared with a case where one coil element constitutes one displacement sensor.

Further, since each of the displacement sensors 84 and 94 has an independent detection surface with respect to the target member 73, and has a structure in which the coil elements 100a and 100b that make a pair are connected in series to each other, as shown FIG. 6, magnetic flux density to be generated can be increased as compared with a case where one coil element 200 constitutes one displacement sensor. Accordingly, the detection sensitivity of a gap from the target member 73 can be made high.

Figure 7:
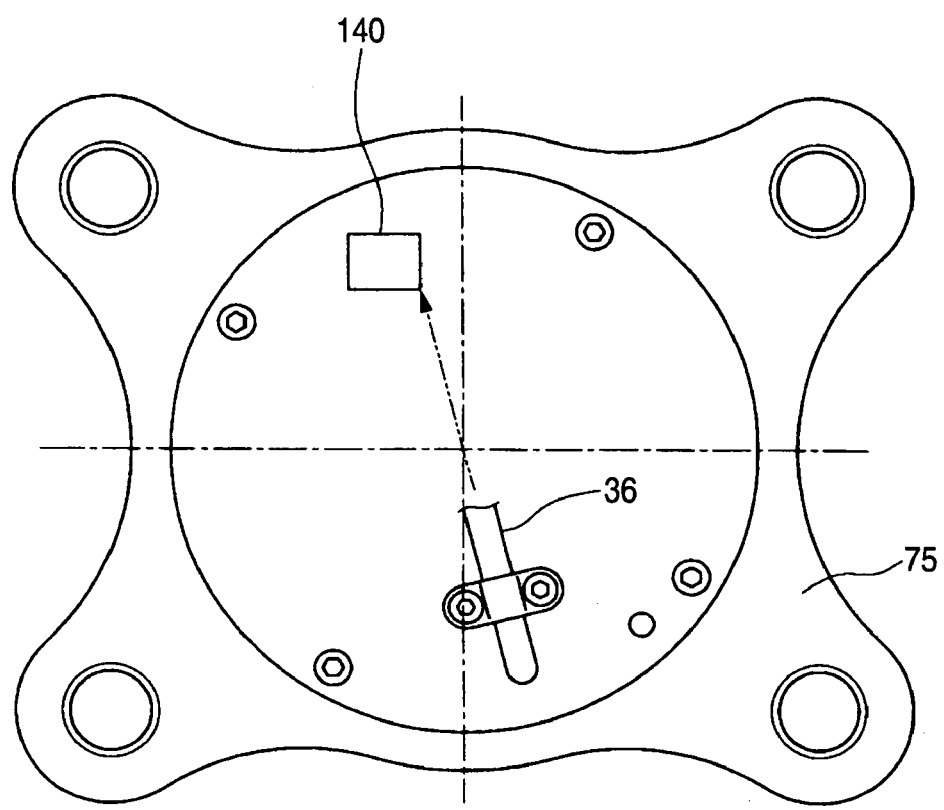
FIG. 7 is a view showing a connection structure between displacement detectors, and a signal processing section that is located opposite the displacement detectors with respect to a lid member.

FIG. 7 is a view showing a connection structure between the displacement detectors 70 and 71, and a signal processing section 140 that is located opposite the displacement detectors 70 and 71 with respect to the lid member 53. The signal processing section 140 is composed of an ECU and the like.

The sensor unit 10 has a signal processing section 140, and the respective displacement sensors 84t, 84b, 84f, 84r, 94t, 94b, 94f, and 94r are connected to the signal processing section 140 via signal lines 36 that pass through the lid member 53 of the case member 6. Output voltages (displacement detection values) obtained from the respective displacement sensors 84t, 84b, 84f, 84r, 94t, 94b, 94f, and 94r are calculated by an operation method to be described below in the signal processing section 140, and thereby, moment loads and translational loads in individual directions, which act on the wheel, are calculated.

Figure 8:
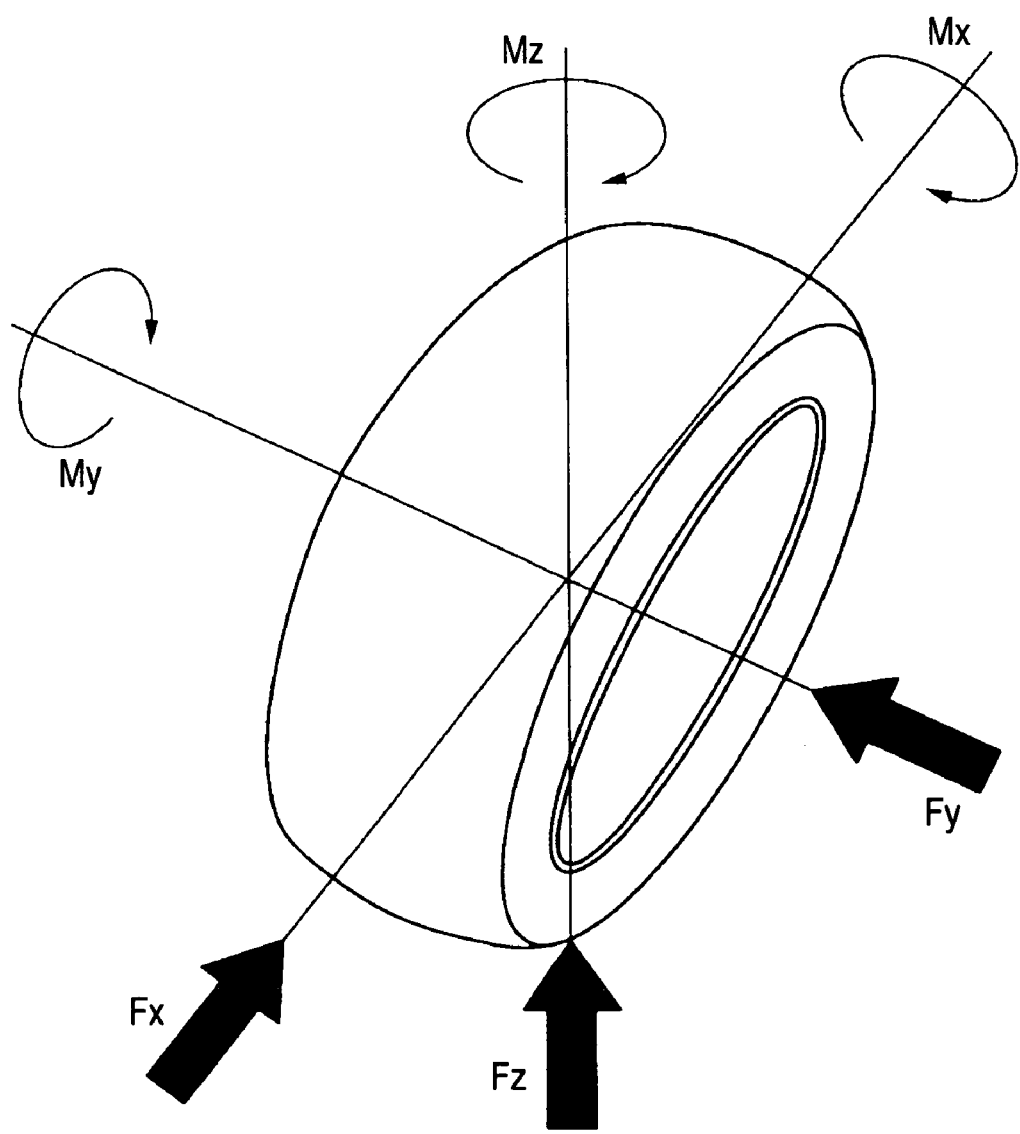
FIG. 8 is a view for explaining directions to be used in the first embodiment.
Figure 9:
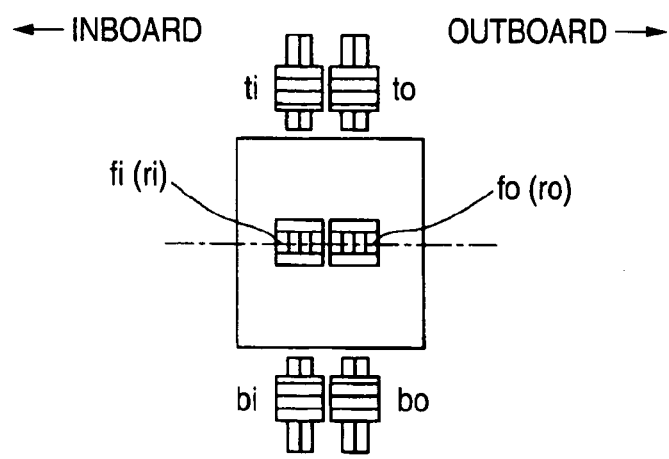
FIG. 9 is a view for explaining definitions of sensor displacement detection values to be used in the first embodiment.
Figure 10:
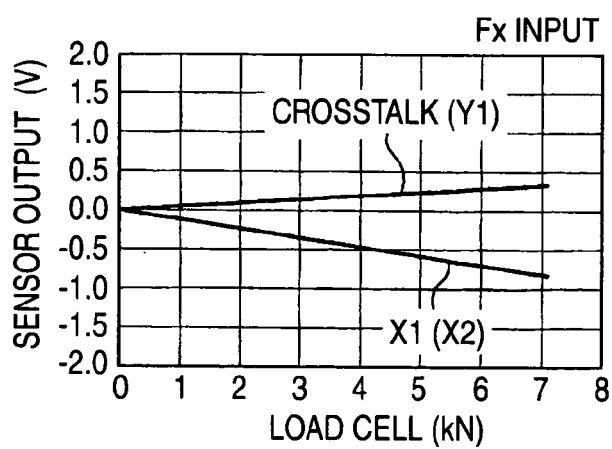
FIG. 10 is a graph showing an experimental example where the relationship between the value of a differential signal, and a force or load actually applied to a hub unit is investigated.

FIG. 8 is a view for explaining directions to be used in the first embodiment, and FIGS. 9 and 10 are views for explaining definitions of displacement detection values of the sensors to be used in the first embodiment. FIG. 9 is a view when the displacement sensors are seen from the radial outside.

As shown in FIG. 8, in the first embodiment, a front-and-rear horizontal direction of the wheel is defined as an x-axis direction, a right-and-left horizontal direction (axial direction) of the wheel is defined as a y-axis direction, and a vertical direction of the wheel is defined as a z-axis direction.

Further, as shown in FIG. 9, a suffix "i" is used for displacement detection values of the four displacement sensors 84t, 84b, 84f, and 84r on the inner side, and a suffix "o" is used for the four displacement sensors 94t, 94b, 94f, and 94r on the outer side. Further, as already described above, a displacement detection value of a front sensor is defined as "f" (front), a displacement detection value of a rear sensor is defined as "r" (rear), a displacement detection value of a top sensor is defined as "t" (top), and a displacement detection value of a bottom sensor is defined as "b" (bottom).

From the foregoing, displacement detection values of a total of eight sensors of the sensor unit 10 are defined as follows.

fi: Displacement detection value of displacement sensor 84f ri: Displacement detection value of displacement sensor 84r ti: Displacement detection value of displacement sensor 84t bi: Displacement detection value of displacement sensor 84b fo: Displacement detection value of displacement sensor 94f ro: Displacement detection value of displacement sensor 94r to: Displacement detection value of displacement sensor 94t bo: Displacement detection value of displacement sensor 94b Here, five differential signals x1, x2, z1, z2, and y1 are defined as follows.

$$x1 = fi - ri$$

$$x2 = fo - ro$$

$$Z1 = bi - ti$$

$$z2 = bo - to$$

$$y1 = (fi + ri + ti + bi) - (fo + ro + to + bo)$$

In the first embodiment, displacement sensors 84t, 84b, 84f, 84r, 94t, 94b, 94f and 94r are arranged on the inner side and on the outer side. Thus, xi represents a displacement detection value of displacement in the x-axis direction on the inner side, zi represents a displacement detection value of displacement in the z-axis direction on the inner side, xo represents a displacement detection value of displacement in the x-axis direction on the outer side, and zo represents a displacement detection value of displacement in the z-axis direction on the outer side.

FIGS. 10 to 14 are graphs showing experimental examples where the relationship between the values of the differential signals, and forces or loads actually applied to the hub unit is investigated. In FIGS. 10 to 14, the axis of ordinate shows values (here, the differential signals show values of voltages) of differential signals, and the axis of abscissa shows values of forces or moments that actually act on the hub unit.

Figure 11:
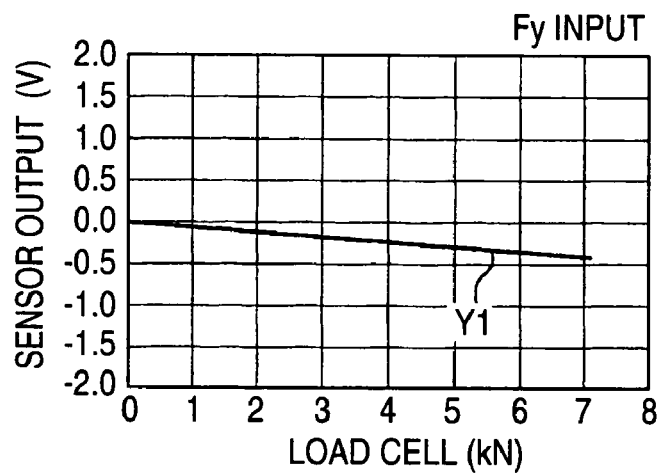
FIG. 11 is a graph showing an experimental example where the relationship between the value of a differential signal, and a force or load actually applied to the hub unit is investigated.
Figure 12:
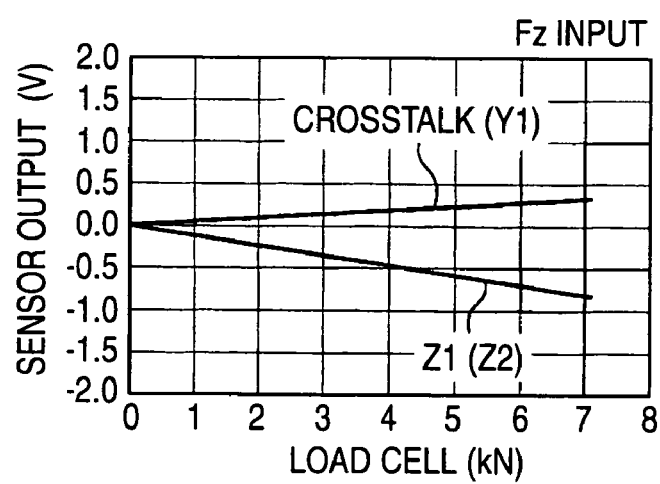
FIG. 12 is a graph showing an experimental example where the relationship between the value of a differential signal, and a force or load actually applied to the hub unit is investigated.

Specifically, FIG. 10 shows outputs of the differential signals in a case where a force is applied to the hub unit only in a direction indicated by an arrow Fx in FIG. 8, FIG. 11 shows outputs of the differential signals in a case where a force is applied to the hub unit only in a direction indicated by an arrow Fy in FIG. 8, and FIG. 12 shows outputs of the differential signals in a case where a force is applied to the hub unit only in a direction indicated by an arrow Fz in FIG. 8.

Figure 13:
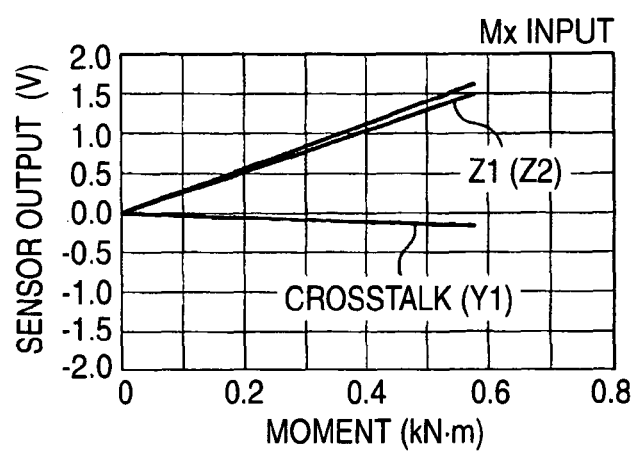
FIG. 13 is a graph showing an experimental example where the relationship between the value of a differential signal, and a force or load actually applied to the hub unit is investigated.
Figure 14:
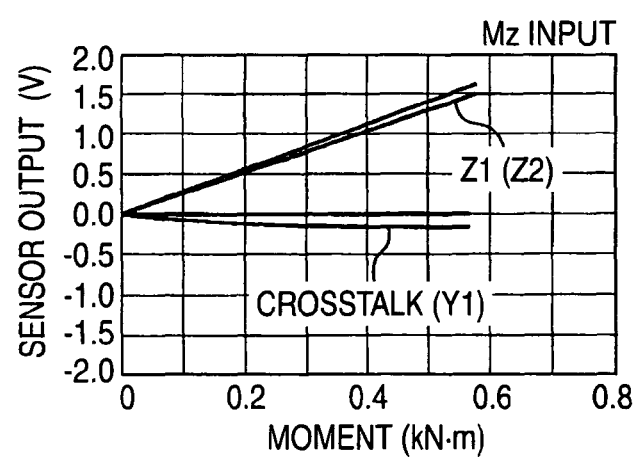
FIG. 14 is a graph showing an experimental example where the relationship between the value of a differential signal, and a force or load actually applied to the hub unit is investigated.

Further, FIG. 13 shows outputs of the differential signals in a case where only a moment load denoted by Mx in FIG. 8 is applied to the wheel, and FIG. 14 shows outputs of the differential signals in a case where only a moment load denoted by Mz in FIG. 8 is applied to the wheel.

As shown in FIG. 10, in a case where only a force in the x direction is applied to the hub unit, the magnitude (Fx) of the force and the values of the differential signals in the x direction show linear relation (proportional relation). Further, as shown in FIG. 11, in a case where only a force in the y direction is applied to the hub unit, the magnitude (Fy) of the force and the values of the differential signals in the y direction show linear relation (proportional relation). Further, as shown in FIG. 12, in a case where only a force in the z direction is applied to the hub unit, the magnitude (Fz) of the force and the values of the differential signals in the z direction show linear relation (proportional relation).

Further, as shown in FIGS. 13 and 14, in a case where a moment load is applied to the wheel around the x-axis, the magnitude (Mx) of the moment and the values of the differential signals in the z direction shows linear relation (proportional relation), and in a case where a moment load is applied to the wheel around the z-axis, the magnitude (Mz) of the moment and the values of the differential signals in the x direction show linear relation (proportional relation).

In FIGS. 13 and 14, the fact that the values of the sensors on the inner side are greater than those of the sensors on the outer side (vehicle side) is due to a greater distance from the wheel.

In FIGS. 10, 11, 12 and 13, the differential signals in the y direction shows values (cross talk) that are not 0 (zero). These are values that should originally be 0 (zero). The cross talk signals are erroneous signals that are considered to be generated by making the detection capability of the sensors high, and are signals that do not affect the calculation of loads at all.

As shown in FIGS. 10 to 14, forces (loads) and the respective differential signals are in a linear relation (proportional relation).

Accordingly, the following relation (1) is satisfied from FIGS. 10 to 14.

$$\begin{bmatrix} x1 \\ x2 \\ z1 \\ z2 \\ y1 \end{bmatrix} = \begin{pmatrix} m11 & m12 & m13 & m14 & m15 \\ m21 & m22 & m23 & m24 & m25 \\ m31 & m32 & m33 & m34 & m35 \\ m41 & m42 & m43 & m44 & m45 \\ m51 & m52 & m53 & m54 & m55 \end{pmatrix} \times \begin{bmatrix} Fx \\ Fy \\ Fz \\ Mx \\ Mz \end{bmatrix} \quad (1)$$

Here, for example, m1 is a constant that represents the inclination of x1 in FIG. 10, and other matrix elements are constants that are determined from the inclinations of respective straight lines of FIGS. 10 to 14.

The following Expression (2) is derived the above Expression (1).

$$\begin{bmatrix} Fx \\ Fy \\ Fz \\ Mx \\ My \end{bmatrix} = \begin{pmatrix} m11 & m12 & m13 & m14 & m15 \\ m21 & m22 & m23 & m24 & m25 \\ m31 & m32 & m33 & m34 & m35 \\ m41 & m42 & m43 & m44 & m45 \\ m51 & m52 & m53 & m54 & m55 \end{pmatrix}^{-1} \times \begin{bmatrix} x1 \\ x2 \\ z1 \\ z2 \\ y1 \end{bmatrix} \quad (2)$$

$$= \begin{pmatrix} n11 & n12 & n13 & n14 & n15 \\ n21 & n22 & n23 & n24 & n24 \\ n31 & n32 & n33 & n34 & n35 \\ n41 & n42 & n43 & n44 & n45 \\ n51 & n52 & n53 & n54 & n55 \end{pmatrix} \times \begin{bmatrix} x1 \\ x2 \\ z1 \\ z2 \\ y1 \end{bmatrix}$$

The signal processing section 140 of the hub unit of the first embodiment has a storage part, and 25 elements of a constant matrix of five rows and five columns denoted by $n_{ij}$ (each of i and j takes any value of 1 to 5) of the above Expression (2) are input to the storage part in advance as a look-up table.

In the hub unit of the first embodiment, if the respective sensors output signals to the signal processing section 140, the signal processing section calculates the differential signals x1, x2, z1, z2, and y1 on the basis of those signals. Thereafter, the operation of the Expression (2) is performed from the calculated x1, x2, z1, z2, and y1, and the 25 elements $n_{ij}$ of the constant matrix of five rows and five columns stored in the storage part, thereby calculating Fx, Fy, Fz, Mx, and Mz that are actual forces (loads) that act on the hub unit.

According to the hub unit of the embodiment, the first displacement detector 70 and the second displacement detector 71 that are spaced axially from each other are provided. Therefore, not only translational loads based on axial translational displacement can be calculated on the basis of a detection signal of the first displacement detector 70, and a detection signal of the second displacement detection signal 71, but also changes in displacement depending on the axial position of the rolling bearing device can be detected, and moment loads that act on the rolling bearing device can be calculated on the basis of the change in displacement.

Further, according to the hub unit of the first embodiment, only by referring to the above $n_{ij}$, a translational load in a vertical direction of the vehicle, a translational load in a traveling direction of the vehicle, a translational load in an axial direction of the wheel, a moment load around the vertical direction of the vehicle, and a moment load around the traveling direction of the vehicle can be calculated simply, inexpensively, and precisely.

In addition, in the hub unit of the first embodiment, the differential signal in the y direction is y1=fi+ri+ti+bi−(fo+ro+to+bo). However, In the rolling bearing device of the invention, instead of y1=fi+ri+ti+bi−(fo+ro+to+bo), the difference between the output of at least one of the above four sensors that constitute the first displacement detector, such as fi−fo, ri−ro, ti−to, bi−bo, or fi+ri−(fo+ro), and the output of at least one sensor of the second displacement detector that substantially overlaps at least one of the above four sensors axially may be adopted as the differential signal in the y direction.

In the hub unit of the above first embodiment, the displacement detectors 70 and 71 are fixed to the case member 6. However in the invention, the displacement detectors may be directly attached to the outer ring.

Further, in the rolling bearing device of the first embodiment, the displacement-detected portion is the outer peripheral surface of the target member 73 that is separate from the inner shaft 1. In the invention, however, the displacement-detected portion may be a portion of an outer peripheral surface of the inner shaft, not the target member. Further, in the rolling bearing device of the first embodiment, the inner ring 2 that is separate from the inner shaft 1 is adapted to fit to the inner shaft 1. However, in the invention, the second raceway member may be constituted by only the inner shaft, not the inner ring, or may be constituted by the inner shaft and the target member, and the inner shaft may have two raceway surfaces on the outer peripheral surface of the inner shaft.

Further, in the rolling bearing device of the first embodiment, the outer ring 1 constitutes a fixed raceway member, and the inner shaft 2 and the like on the inner circumferential side constitutes a rotating raceway member. However, the inner shaft and the like on the inner circumferential side may constitute the fixed raceway member, and the outer ring may constitute the rotating raceway member.

Figure 15:
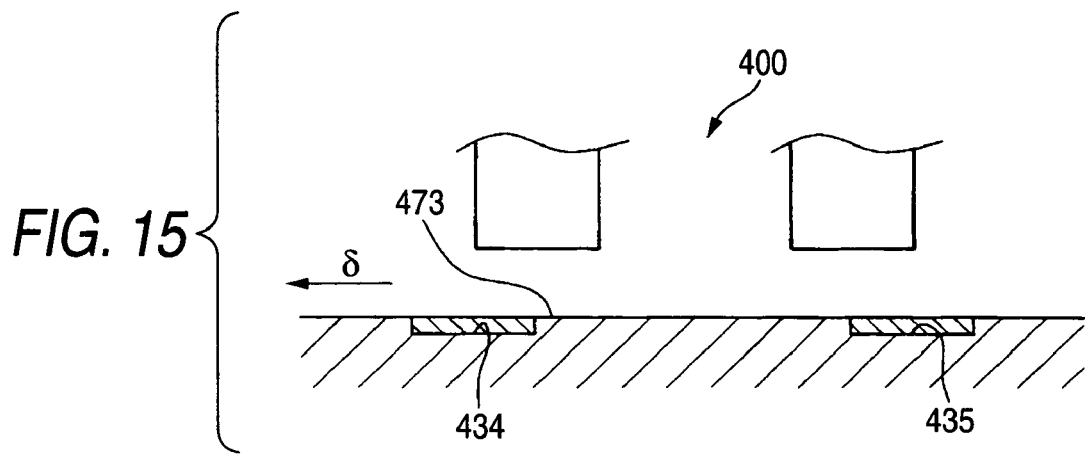
FIG. 15 is a view for explaining a modified example of the sensor unit.
Figure 16:
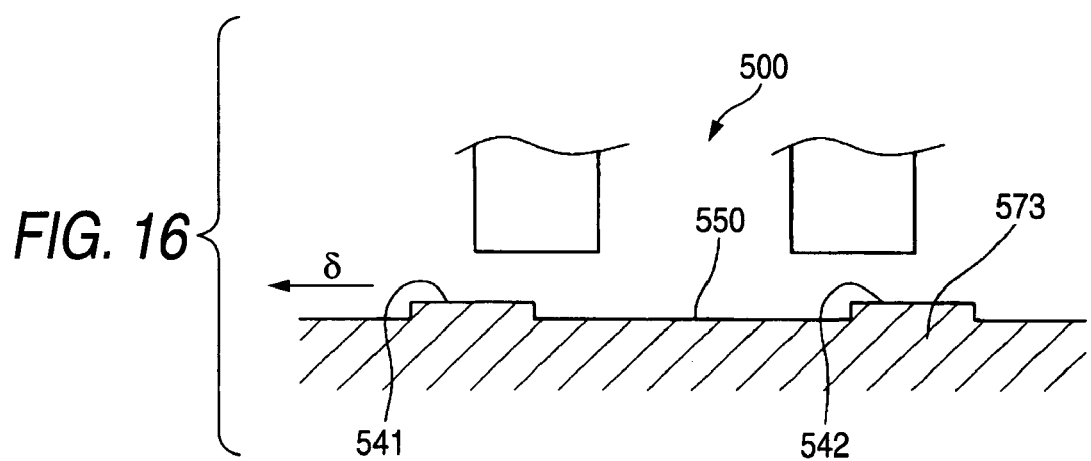
FIG. 16 is a view for explaining a modified example of the sensor unit.
Figure 17:
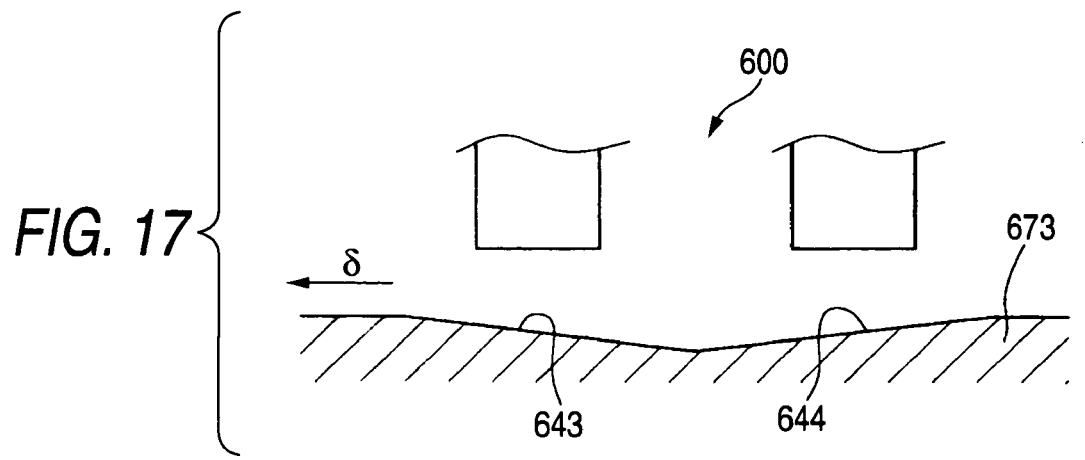
FIG. 17 is a view for explaining a modified example of the sensor unit.

Further, the sensor unit that can be used in the invention is not limited to the sensor unit 10 used in the above first embodiment, and may be sensor units whose portions are shown in FIGS. 15, 16, and 17.

Specifically, like a sensor unit 400 shown in FIG. 15, the annular grooves 134 and 135 may not be formed in the target member 473, but annular striped portions 434 and 435 that have larger (or smaller) permeability than its surrounding constituent material may be formed in positions where the annular grooves 134 and 135 existed. The annular striped portions 434 and 435 can be formed by changing carbon content in the case of, for example, steel.

Further, like a sensor unit 500 shown in FIG. 16, convex portions 541 and 542 whose outer peripheral surfaces are cylinder surfaces may be formed in the positions of the target member 573 where the annular grooves 134 and 135 were formed in the above first embodiment, and an annular portion 550 the external diameter of a hill portion of which is smaller than the convex portions 541 and 542 may be formed in the position where the annular portion 150 was formed.

Further, like a sensor unit 600 shown in FIG. 17, inclined portions 643 and 644 the directions of inclination of which are opposite to each other in an axial section may be formed on an outer peripheral surface of a target member 673, and an annular portion having a groove may be formed in a portion of each of the inclined portions 643 and 644. In addition, although FIG. 17 shows that joined portions of both the inclined portions 643 and 644 are formed in the shape of a valley, the joined portions may be formed as both inclined portions that are formed in the shape of a chevron.

Further, the sensor unit that can be used in the invention is not limited to the inductance-type displacement sensor that has been described in the first embodiment. That is, the sensor unit that can be used in the invention may be any kinds of displacement sensors as long as they are non-contact-type sensor units that can detect a gap.

Further, in the above first embodiment, the rolling bearing device is a hub unit. However, the rolling bearing devices with a sensor of this invention is not limited the hub unit, and may be any kinds of bearing devices, such as a magnetic bearing device, other than the hub unit. This is because it is needless to say that the configuration of the invention described in the first embodiment can be applied to various bearing devices with the needs for measuring a plurality of moment loads or translational loads.

Further, in the rolling bearing device of the above first embodiment, the rolling elements of a rolling bearing with a sensor to be manufactured are balls. However, in the invention, the rolling elements of the rolling bearing with a sensor to be manufactured may be rollers or may include rollers and balls.

In the above first embodiment, the five loads Fx, Fy, Fz, Mx, and Mz are calculated from five-differential signals.

However, like other embodiments of the invention to be described below, the operation shown below may be performed instead of the above-described operation by the signal processing section serving as a calculator.

The radius of a wheel is changed dynamically, and an error may be caused if the radius is treated as an eigenvalue. However, in a case where it is used for a detection signal for vehicle control, the degree of precision (<1 to 2%) at the level of a measuring instrument is not required, and even if the radius of a tire is set to a fixed value, the vehicle control is not greatly affected. Further, in an actual vehicle, there is no case that only Mx is generated, and Mx is generated depending on Fy. Accordingly, assuming the tire radius R is a fixed value, Mx≅Fy×R is satisfied.

From the foregoing, the above Fz, Fx, Fy, Mz, and Mx may be calculated on the basis of four values of fi−ri, ti−bi, fo−ro, to−ro, and (fi+ri+ti+bi−(fo+ro+to+bo)), the constant matrix of four rows and four columns, and a relational expression Fy=Mx÷R.

Specifically, in the following Expression (4), Fx, Fz, Mx, and Mz may be found, and then, Fy may be calculated on the basis of the Expression Fy=Mx÷R from the found Mx.

First, a constant matrix of four rows and four columns in which the following Relationship (3) is satisfied is found from FIGS. 10 to 14.

$$\begin{bmatrix} x1 \\ x2 \\ z1 \\ z2 \end{bmatrix} = \begin{pmatrix} l11 & l12 & l13 & l14 \\ l21 & l22 & l23 & l24 \\ l31 & l32 & l33 & l34 \\ l41 & l42 & l43 & l44 \end{pmatrix} \times \begin{bmatrix} Fx \\ Fz \\ Mx \\ Mz \end{bmatrix} \qquad (3)$$

Using an inverse matrix of the constant matrix of four rows and four columns, the following Expression (4) is found.

$$\begin{bmatrix} Fx \\ Fz \\ Mx \\ Mz \end{bmatrix} = \begin{pmatrix} l11 & l12 & l13 & l14 \\ l21 & l22 & l23 & l24 \\ l31 & l32 & l33 & l34 \\ l41 & l42 & l43 & l44 \end{pmatrix}^{-1} \times \begin{bmatrix} x1 \\ x2 \\ z1 \\ z2 \end{bmatrix} \qquad (4)$$

$$= \begin{pmatrix} p11 & p12 & p13 & p14 \\ p21 & p22 & p23 & p24 \\ p31 & p32 & p33 & p34 \\ p41 & p42 & p43 & p44 \end{pmatrix} \times \begin{bmatrix} x1 \\ x2 \\ z1 \\ z2 \end{bmatrix}$$

In addition, in this case, it is needles to say that the values of $p_{ij}$ (i, j=1 to 4) are input to the storage part of the signal processing section serving as a calculator in advance as a look-up table.

In addition, it is needles to say that Fx, Fy, Fz, Mx, and Mz may be found on the basis of the following Expressions (5) and (6), and Fy=Mx÷R instead of the above Expressions (3) and (4).

First, a constant matrix of four rows and four columns in which the following relationship (5) is satisfied is found from FIGS. 10 to 14.

$$\begin{bmatrix} x1 \\ x2 \\ z1 \\ y1 \end{bmatrix} = \begin{pmatrix} o11 & o12 & o13 & o14 \\ o21 & o22 & o23 & o24 \\ o31 & o32 & o33 & o34 \\ o41 & o42 & o43 & o44 \end{pmatrix} \times \begin{bmatrix} Fx \\ Fy \\ Fz \\ Mz \end{bmatrix} \quad (5)$$

Using an inverse matrix of the constant matrix of four rows and four columns, the following Expression (6) is found.

$$\begin{bmatrix} Fx \\ Fy \\ Fz \\ Mz \end{bmatrix} = \begin{pmatrix} o11 & o12 & o13 & o14 \\ o21 & o22 & o23 & o24 \\ o31 & o32 & o33 & o34 \\ o41 & o42 & o43 & o44 \end{pmatrix}^{-1} \times \begin{bmatrix} x1 \\ x2 \\ z1 \\ y1 \end{bmatrix} \quad (6)$$

$$= \begin{pmatrix} q11 & q12 & q13 & q14 \\ q21 & q22 & q23 & q24 \\ q31 & q32 & q33 & q34 \\ q41 & q42 & q43 & q44 \end{pmatrix} \times \begin{bmatrix} x1 \\ x2 \\ z1 \\ y1 \end{bmatrix}$$

In addition, in this case, it is needles to say that the values of $q_{ij}$(i, j=1 to 4) are input to the storage part of the signal processing section serving as a calculator in advance as a look-up table.

In short, Fx, Fy, Fz, Mx, and Mz can be calculated by the following steps.

That is, either a four-dimensional vector of Fx, Fy, Fz, and Mz or a four-dimensional vector of Fx, Fz, Mz, and Mx is adopted, and four arbitrary differential signals out of the five differential signals are adopted. Thereafter, an expression equivalent to the above Expression (5) is created for the adopted four-dimensional vector and four differential signals, and a constant matrix of four rows and four columns is found. Thereafter, an expression equivalent to the above Expression (6) is derived from an inverse matrix of the constant matrix. Finally, the above Fx, Fy, Fz, Mx, and Mz are calculated from actual values of the adopted four differential signals, the expression equivalent to the above Expression (6), and Fy=Mx÷R.

According to a modified example using this constant matrix of four rows and four columns, five loads can be calculated by four signals. Accordingly, since the sensors only need to output not five signals but four signals, the degree of freedom of sensor arrangement, and the degree of freedom of the structure of a displacement-detected portion can be markedly increased. Accordingly, machining of a displacement-detected portion can be markedly simplified, and in a case where a displacement-detected portion is of a mounting type, mounting of the displacement-detected portion can be markedly simplified. Further, the operation of the signal processing section serving as a calculator can be markedly simplified.

In addition, in a case where five loads are calculated using the constant matrix of four rows and four columns, it is needless to say that a value that is obtained by subtracting from an output of one sensor of the first displacement detector an output of one sensor of the second displacement detector that substantially overlaps the one sensor axially, or a value that is obtained by subtracting from the sum of outputs of three or less sensors of the first displacement detector the sum of outputs of a plurality of sensors of the second displacement detector that substantially overlap the three or less sensors axially may be used instead of (fi+ri+ti+bi−(fo+ro+to+bo)). In addition, it is needles to say that, if (fi+ri+ti+bi−(fo+ro+to+bo)) is used, loads in the vertical direction and in the front-back direction can be averaged, which is preferable.

Second Embodiment

Figure 18:
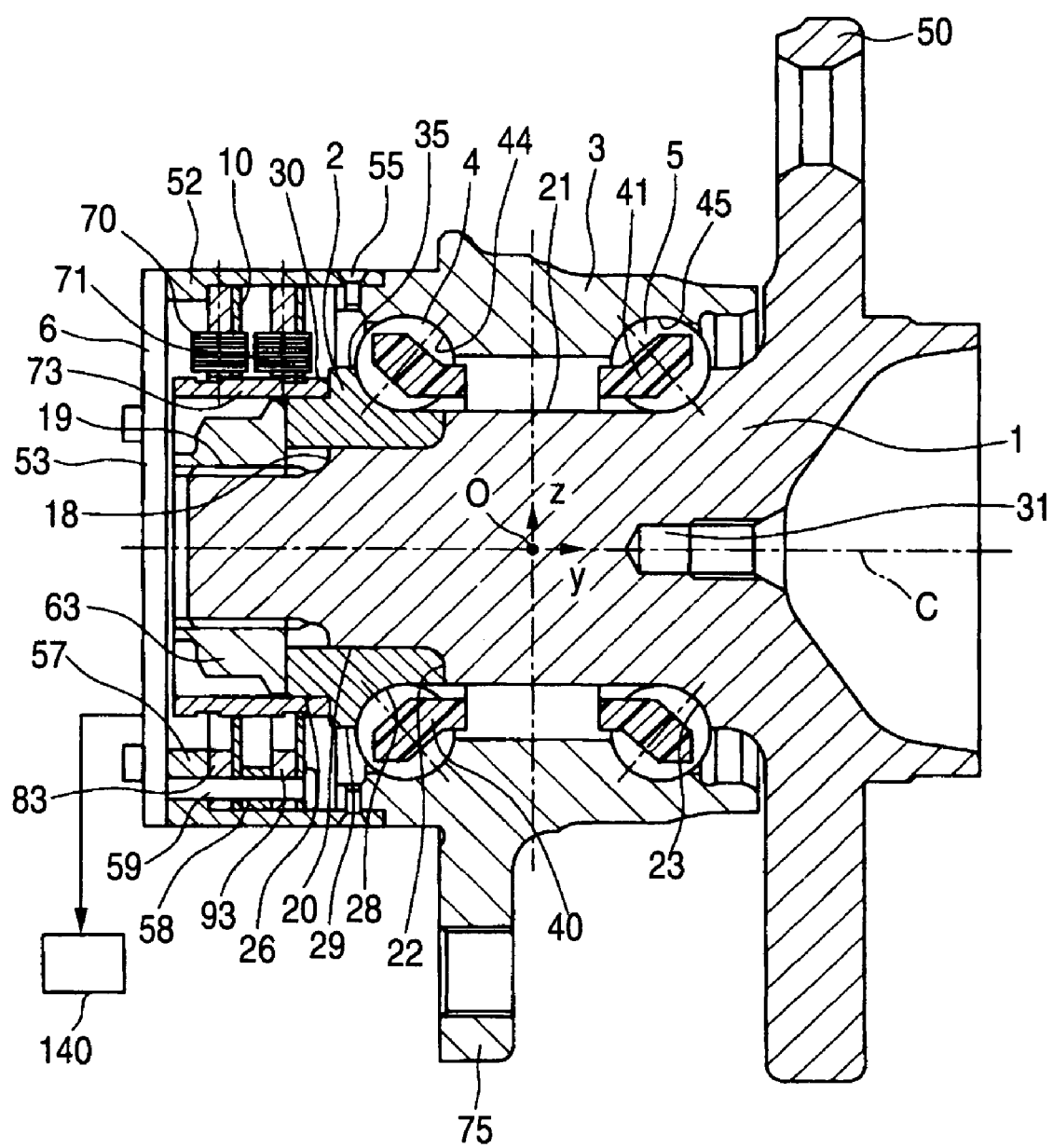
FIG. 18 is an axial sectional view of a rolling bearing device with a sensor of a hub unit according to a second embodiment of the invention.

FIG. 18 is an axial sectional view of a rolling bearing device with a sensor of a hub unit according to a second embodiment of the invention.

The hub unit includes an inner shaft 1, an inner ring 2, an outer ring 3 serving as a first raceway member, a plurality of first balls 4 serving as rolling elements, a plurality of second balls 5 serving as rolling elements, a case member 6, and a sensor unit 10.

The inner shaft 1 has a small-diameter shaft portion 19, a middle-diameter shaft portion 20, and a large-diameter shaft portion 21 serving as a second shaft portion. An outer peripheral surface of the small-diameter shaft portion 19 is formed with a thread. The middle-diameter shaft portion 20 is connected to the small-diameter shaft portion 19 via a stepped portion 18, and has a larger external diameter than the external diameter of the small-diameter shaft portion 19. The large-diameter shaft portion 21 is located on the side of the middle-diameter shaft portion 20 opposite the small-diameter shaft portion 19. The large-diameter shaft portion 21 is connected to the middle-diameter shaft portion 20 via a stepped portion 22, and has a larger external diameter than the external diameter of the middle-diameter shaft portion 20. The outer peripheral surface of the large-diameter shaft portion 21 has an angular raceway groove 23 serving as a raceway surface, and the external diameter of the raceway groove 23 becomes large as being separated from the middle-diameter shaft portion 20.

The inner shaft 1 has a center hole 31. The center hole 31 is formed in a radial central portion of an axial end surface of the inner shaft 1 on the side of the large-diameter shaft portion 21. The center hole 31 has a cylindrical portion, and extends by a predetermined distance axially. Further, the inner shaft 1 has a rotor-attaching flange 50 (or wheel-attaching flange) for attaching a rotor (or wheel) (not shown) to an axial end thereof on the side of the large-diameter shaft portion 21.

The inner ring 2 is externally fitted and fixed to an outer peripheral surface of the middle-diameter shaft portion 20 of the inner shaft 1. An axial end surface of the inner ring 2 on the side of the large-diameter shaft portion 21 abuts on the stepped portion 22. The inner ring 2 has an angular raceway groove 28 serving as a raceway surface in its outer peripheral surface on the side of the large-diameter shaft portion 21. The external diameter of the raceway groove 28 becomes large as being separated from the large-diameter shaft portion 21. An axial portion of an outer peripheral surface of the inner ring 2 opposite the large-diameter shaft portion 21 has a cylindrical outer peripheral surface 26, and the cylindrical outer peripheral surface 26 is connected to a raceway shoulder 29 of the raceway groove 28, which is located opposite the large-diameter shaft portion 21, via a stepped portion 30. The raceway shoulder 29 has a cylindrical outer peripheral surface 35. The external diameter of the cylindrical outer peripheral surface 26 located at the axial end of the outer peripheral surface of the inner ring 2 is made smaller than the external diameter of the cylindrical outer peripheral surface 35 of the raceway shoulder 29.

The axial end surface of the inner ring 2 on the side of the large-diameter shaft portion 21 abuts on the stepped portion 22. As shown in FIG. 18, a nut 63 is screwed to the thread of the small-diameter shaft portion 19. An axial end surface of the inner ring 2 opposite the large-diameter shaft portion 21 abuts on an axial end surface of the nut 63 on the side of the large-diameter shaft portion 21. By screwing the nut 63 toward the large-diameter shaft portion 21 in the axial direction by a predetermined distance, the inner ring 2 is firmly fixed to the inner shaft 1.

The outer ring 3 is located radially outside the large-diameter shaft portion 21. An inner peripheral surface of the outer ring 3 has an angular first raceway groove 44 serving as a raceway surface, and an angular second raceway groove 45 serving as a raceway surface. The outer ring 3 has a body-attaching flange 75 for fixation to a vehicle body. The plurality of first balls 4 are arranged at intervals from each other in a circumferential direction in a state where they are held by a first cage 40 between the raceway groove 28 of the inner ring 2, and the first raceway groove 44 of the outer ring 3, and the plurality of second balls 5 are arranged at intervals from each other in a state they are held by a second cage 41 between the raceway groove 23 of the inner shaft 1, and the second raceway groove 45 of the outer ring 3.

The case member 6 is constituted by a tubular member 52 and a disk-like lid member 53. An axial end of the tubular member 52 on the side of the outer ring 3 is fixed to an end of an outer peripheral surface of the outer ring 3 on the side of the small-diameter shaft portion 19 by locking screws 55. Meanwhile, the lid member 53 blocks an opening of the tubular member 52 opposite the outer ring. The lid member 53 prevents foreign matters from entering the rolling bearing device.

The sensor unit 10 has a first displacement detector 70, a second displacement detector 71, and a target member 73. The first and second displacement detectors 70 and 71 are fixed to an inner peripheral surface of the tubular member 52. Meanwhile, the target member 73 has a tubular shape. One axial end of the target member 73 is pressed into the cylindrical outer peripheral surface 26 of the inner ring 2 by press fitting. In other words, the one end of the target member 73 is externally fitted and fixed to the cylindrical outer peripheral surface 26 that is one end of the outer peripheral surface of the inner ring 2. The inner shaft 1, the inner ring 2, the nut 63, and the target member 73 constitute the second raceway member, and an outer peripheral surface of the target member 73 becomes a displacement-detected portion.

Figure 19:
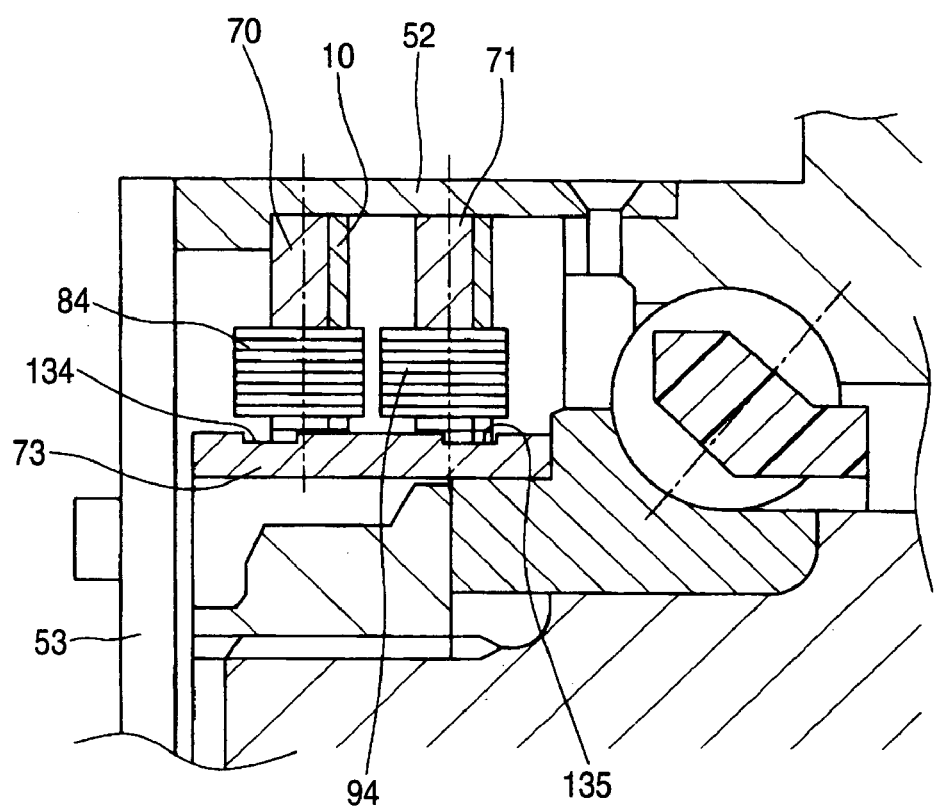
FIG. 19 is an enlarged sectional view around a first displacement detector in FIG. 18.

FIG. 19 is an enlarged sectional view around the first displacement detector 70 in FIG. 18.

As shown in FIG. 19, the second displacement detector 71 is located closer to a wheel (the rotor-attaching flange 50) than the first displacement detector 70. The first and second displacement detectors 70 and 71 are fixed to the inner peripheral surface of the tubular member 52. The first displacement detector 70 is the same as the second displacement detector 71, and the first displacement detector 70 is arranged at a distance axially from the second displacement detector 71. The first displacement detector 70 substantially overlaps the second displacement detector 71 axially.

As shown in FIG. 18, a sensor ring 83 and a sensor ring 93 are fixed to the inner peripheral surface of the tubular member 52. The sensor ring 83 and the sensor ring 93 are fixed to a flange 57 of the tubular member 52 by locking screws 59 with an annular spacer 58 interposed therebetween. The first displacement detector 70 has four displacement sensors 84 (refer to FIG. 19), and the second displacement detector 71 has four displacement sensors 94 (refer to FIG. 19). Each of the displacement sensors 84 extends radially inward from an inner peripheral surface of the sensor ring 83, while each of the displacement sensors 94 extends radially inward from an inner peripheral surface of the sensor ring 93.

The first displacement detector 70 and the second displacement detector 71 are fixed to the case member 6 via the sensor rings 83 and 93, respectively. Accordingly, only by fixing the case member 6 to the outer peripheral surface of the outer ring 3 as described above after the first displacement detector 70 and the second displacement detector 71 are fixed to the case member 6 via the sensor rings 83 and 93, the first and second displacement detectors 70 and 71 can be simply fixed to the hub unit. That is, it is not necessary to individually attach the displacement detectors 70 and 71 to the outer ring 3, and it is also not necessary to provide the outer ring 3 with an attachment structure, such as through-holes, for mounting the displacement detectors 70 and 71. Further, since the positions of the displacement detectors 70 and 71 relative to the case member 6 are determined in advance, the displacement detectors 70 and 71 with respect to the target member 73 can be exactly and easily positioned.

Although not shown in FIGS. 18 and 19, the four displacement sensors 84 are arranged at predetermined intervals in the circumferential direction in a radial inner portion of the sensor ring 83 (in the second embodiment, they are arranged at regular intervals in the circumferential direction), while the four displacement sensors 94 are arranged at predetermined intervals in the circumferential direction in a radial inner portion of the sensor ring 93 (in the second embodiment, they are arranged at regular intervals in the circumferential direction).

Figure 20:
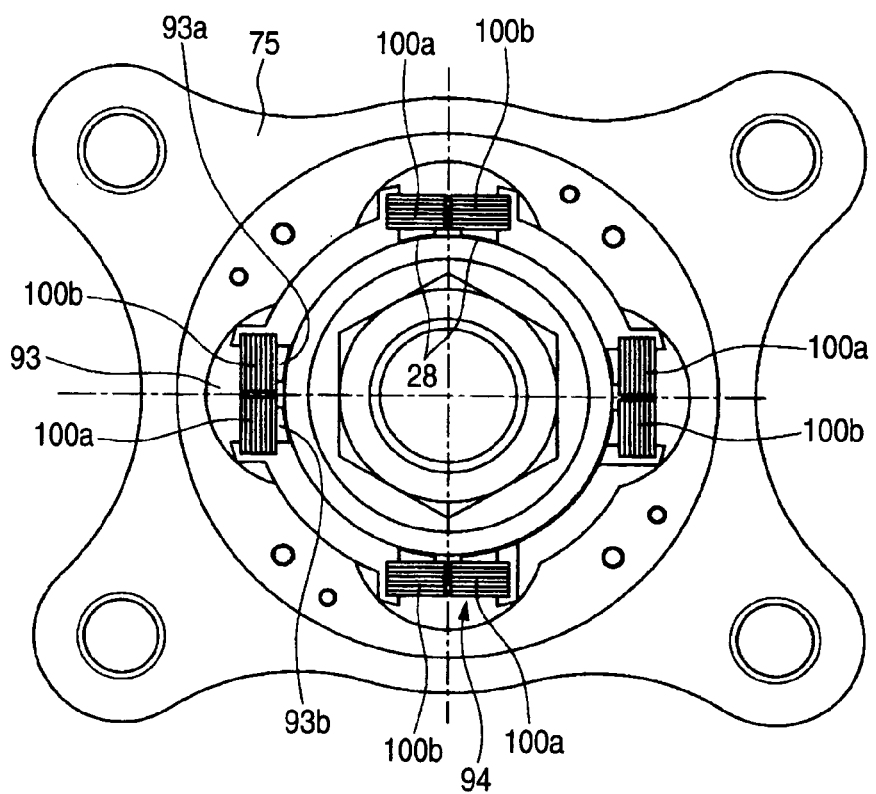
FIG. 20 is a view illustrating a circumferential arrangement configuration of four displacement sensors.

FIG. 20 is a view illustrating a circumferential arrangement configuration of the four displacement sensors 94. In addition, although not described, the four displacement sensors 94 also have the same circumferential arrangement structure as the four displacement sensors 84. Further, reference number 75 in FIG. 20 is a flange of the outer ring 3 denoted by 75 in FIG. 18.

As shown in FIG. 18, each of the displacement sensors 94 is composed of a coil element 100a and a coil element 100b that are arranged in proximity to each other in the circumferential direction, to make a pair. The four displacement sensors 94 are installed in a position that substantially radially faces the portion of the target member 73 that is located on the vertical topmost side, a position that substantially radially faces the portion of the target member 73 that is located on the vertical bottommost side, a position that substantially radially faces the foremost position of a vehicle to which a rolling bearing device is attached in the target member 73, and a position that substantially radially faces the rearmost position of the vehicle to which the rolling bearing device is attached in the target member 73, in a state where the rolling bearing device (hub unit in the second embodiment) is installed in a predetermined position. In addition, the four displacement sensors 84 substantially overlap the four displacement sensors 94 axially.

In each set, the coil element 100a and the coil element 100b that makes a pair have independent detection surfaces, and the coil element 100a and the coil element 100b that makes a pair are connected in series. The sensor ring 93 has a pair of magnetic poles 93a and 93b, which protrude radially inward, at its radial inner end. The coil element 100a is configured such that a coil is wound around the magnetic pole 93a, while the coil element 100b is configured such that a coil is wound around the magnetic pole 93b. In each of the magnetic pole 93a and the magnetic pole 93b, a radial inner end surface 28 is a detection surface. The detection surfaces radially face each other at a distance from the outer peripheral surface of the target member 73.

Hereinafter, in a state where the rolling bearing device (hub unit in the second embodiment) is installed in a predetermined position, a suffix "t" is added to a displacement sensor that substantially radially faces the portion of the target member 73 that is located on the vertical topmost side, a suffix "b" is added to a displacement sensor that substantially radially faces the portion of the target member 73 that is located on the vertical bottommost side, a suffix "f" is added to a displacement sensor that substantially radially faces the foremost position of a vehicle to which a rolling bearing device is attached in the target member 73, and a suffix "r" is added to a displacement sensor that substantially radially faces the rearmost position of the vehicle to which the rolling bearing device is attached in the target member 73.

Figure 21:
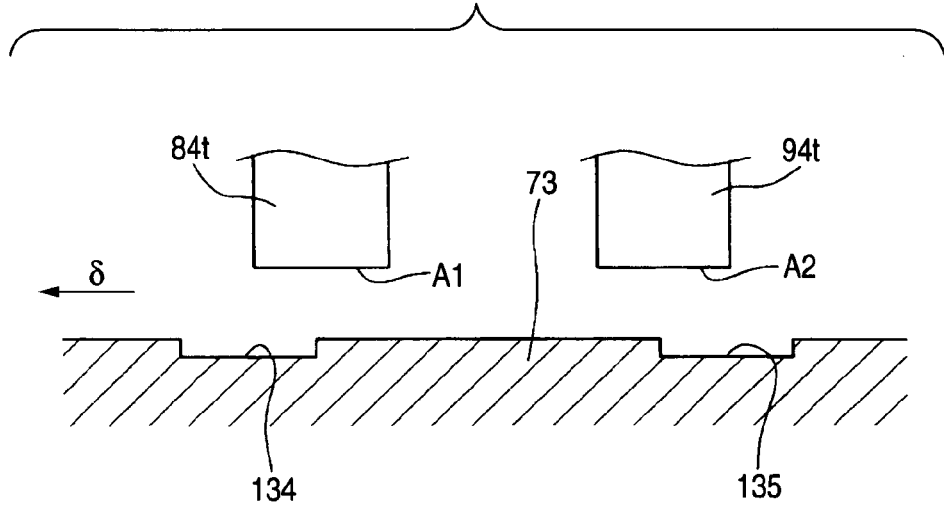
FIG. 21 is a view showing the positional relationship among detection surfaces of the displacement sensors, and a displacement-detected portion.

FIG. 21 is a view showing the positional relationship among a detection surface A1 of the displacement sensor 84*t*, a detection surface A2 of the displacement sensor 94*t*, and a displacement-detected portion.

As shown in FIG. 21, a displacement-detected portion that is an outer peripheral surface of the target member 73 has a first annular groove 134 and a second annular groove 135. The first annular groove 134 and the second annular groove 135 extend in the circumferential direction. The second annular groove 135 is located on the wheel side of the first annular groove 134 at a distance axially from the first annular groove 134.

In addition, although not described, the positional relationship among a detection surface of a displacement sensor 84*b*, a detection surface of a displacement sensor 94*b*, the first annular groove 134, and the second annular groove 135 is the same as the positional relationship among the detection surface A1 of the displacement sensor 84*t*, the detection surface A2 of the displacement sensor 94*t*, the first annular groove 134, and the second annular groove 135. In addition, the positional relationship among a detection surface of a displacement sensor 84*f*, a detection surface of a displacement sensor 94*f*, the first annular groove 134, and the second annular groove 135 is the same as the positional relationship among the detection surface A1 of the displacement sensor 84*t*, the detection surface A2 of the displacement sensor 94*t*, the first annular groove 134, and the second annular groove 135. In addition, the positional relationship among a detection surface of a displacement sensor 84*r*, a detection surface of a displacement sensor 94*r*, the first annular groove 134, and the second annular groove 135 is the same as the positional relationship among the detection surface A1 of the displacement sensor 84*t*, the detection surface A2 of the displacement sensor 94*t*, the first annular groove 134, and the second annular groove 135.

As shown in FIG. 21, in the axial direction, a central portion of the detection surface A1 substantially coincides with the edge of the first annular groove 134 on the side of the second annular groove 135, and a central portion of the detection surface A2 substantially coincides with the edge of the second annular groove 135 on the side of the first annular groove 134.

Supposing the target member 73 has been displaced by a distance 8 toward the lid member 53 axially from this state, the axial lap length (axial overlapping length) between the detection surface A1 and the first annular groove 134 decreases, while the axial lap length (axial overlapping length) between the detection surface A2 and the second annular groove 135 increases. From this, a displacement detection value of a gap of a displacement sensor 84 decreases, while a displacement detection value of a gap of a displacement sensor 94 increases. If the target member 73 is axially displaced in this way, a difference is caused between a displacement detection value to be detected by the displacement sensor 84*t*, and a displacement detection value to be detected by the displacement sensor 94*t*.

In a case where the target member 73 has moved axially, the axial positions of the first annular groove 134 and the second annular groove 135 with respect to the displacement sensors 84*t* and 94*t* are set so that the displacement detection values to be detected by the displacement sensor 84*t* and the displacement sensor 94*t* may be changed in positive/negative opposite directions. By taking a difference between the displacement detection value of the displacement sensor 84*t*, and the displacement detection value of the displacement sensor 94*t*, the axial translational amount (this is an axial displacement, and has a correlation with a translational load) of the inner ring 2 (inner shaft 1) is detected.

By taking differences (differences between displacement detection values of displacement sensors having the same suffix) between displacement detection values of the displacement sensors 84*t*, 84*b*, 84*f*, and 84*r* on the center side (hereinafter referred to as "inner side") of the vehicle, and displacement detection values of the displacement sensors 94*t*, 94*b*, 94*f*, and 94*r* on the wheel side (hereinafter referred to as "outer side"), the displacement detection value of the second raceway member to an axial unit translational amount is amplified. This can enhance the detection sensitivity of the axial displacement of the sensor unit 10.

In addition, contrary to the device shown in FIG. 21, the first annular groove on the inner side may be shifted to the outer side from the detection surface of the first displacement detector, and the second annular groove on the outer side may be shifted to the inner side from the detection surface of the second displacement detector. Even in this case, the same operational effects as the above ones can be obtained.

Figure 22:
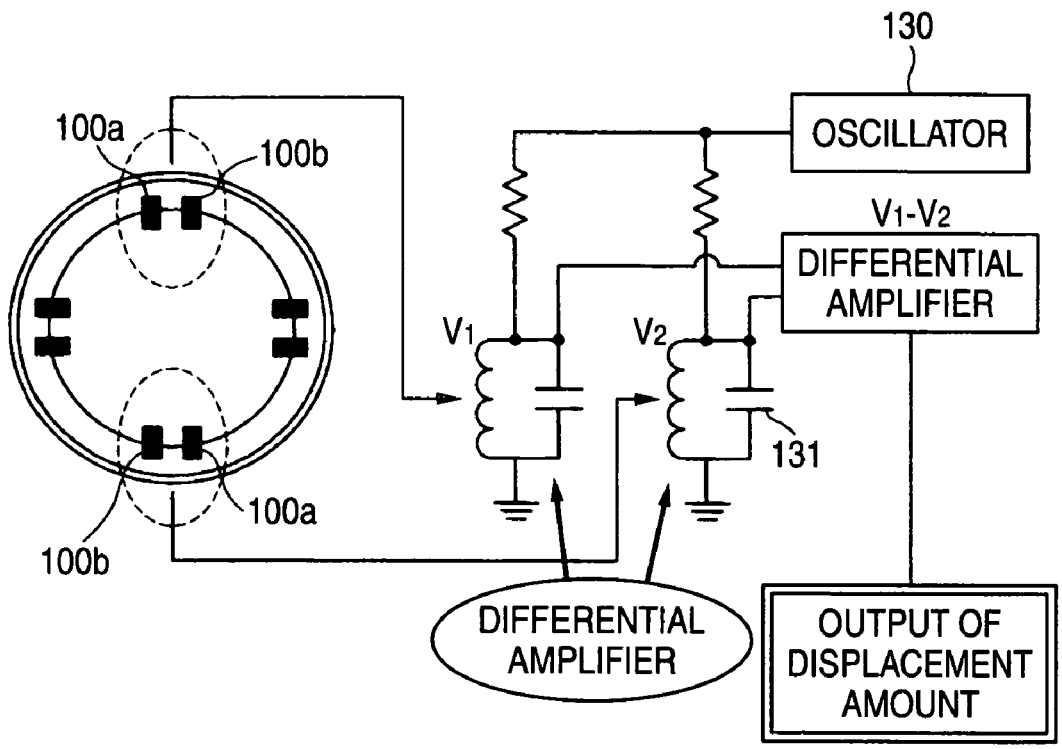
FIG. 22 is a view showing an example of a gap detecting circuit connected to each of a first displacement detector and a second displacement detector.

FIG. 22 is a view showing an example of a gap detecting circuit connected to each of the first displacement detector 70 and the second displacement detector 71.

As shown in FIG. 22, in each of the first displacement detector 70 and the second displacement detector 71, two sets of coil elements 100*a* and coil elements 100*b* that are located in the vertical direction are connected to an oscillator 130. An alternating current during a fixed period is supplied to the two sets of coil elements 100*a* and coil elements 100*b* from the oscillator 130. A synchronizing capacitor 131 is connected in parallel to the two sets of coil elements 100*a* and the coil elements 100*b*.

Also, output voltages (detection values) of one set of coil element 100*a* and coil element 100*b* and the other set of coil element 100*a* and coil element 100*b* are input to a differential amplifier 132, and are taken as output voltages (detection values) corresponding to the above same straight direction, so that a temperature drift may be eliminated. In addition, although not shown, a temperature drift in the other two sets of coil elements 100*a* and coil elements 100*b* that are located in a front-back direction is also eliminated by taking a difference by a differential amplifier similarly to the above. The gap detecting circuit shown in FIG. 22 becomes an example of an orthogonal component calculator. In this example, a first axis corresponds to the vertical direction and the second axis corresponds to the front-back direction.

In each of the displacement sensors 84 and 94, if the inductance of the coil element 100*a* (or coil element 100*b*) is defined as "L", the area of a detection surface is defined as "A", permeability is defined as "μ", the number of turns of a coil is defined as "N", and the distance (gap) from the detection surface to the target member 73 is defined "d", the following Expression (a) is satisfied.

$$L = A \times \mu \times N^2 / d \quad \text{(a)}$$

If the gap d to the target member 73 changes, the inductance L of each of the displacement sensors 84 and 94 changes, and the output voltages change. Accordingly, by detecting changes in the output voltages, the radial gap from the detection surface of each of the displacement sensors 84 and 94 to the target member 73 can be detected.

Figure 23:
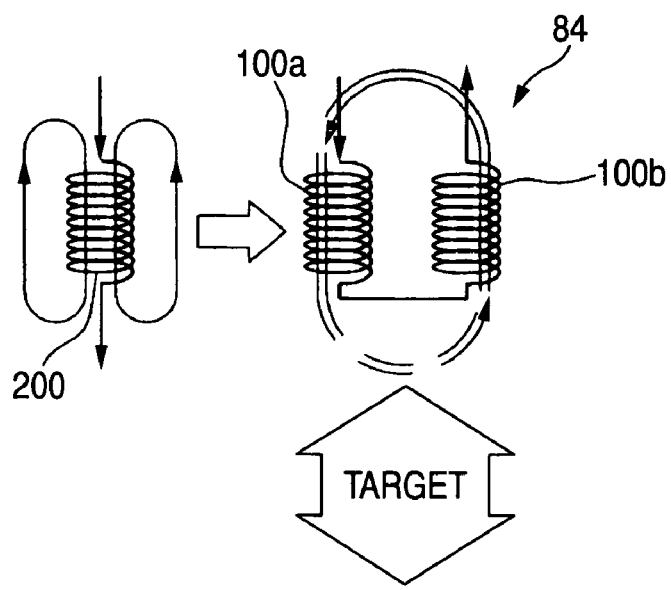
FIG. 23 is a view for explaining that the magnetic flux density to be generated in the displacement sensors used in this embodiment can be increased as compared with a case where one coil element constitutes one displacement sensor.

Further, since each of the displacement sensors 84 and 94 has an independent detection surface with respect to the target member 73, and has a structure in which the coil elements 100a and 100b that make a pair are connected in series to each other, as shown FIG. 23, magnetic flux density to be generated can be increased as compared with a case where one coil element 200 constitutes one displacement sensor. Accordingly, the detection sensitivity of a gap from the target member 73 can be made high.

Figure 24:
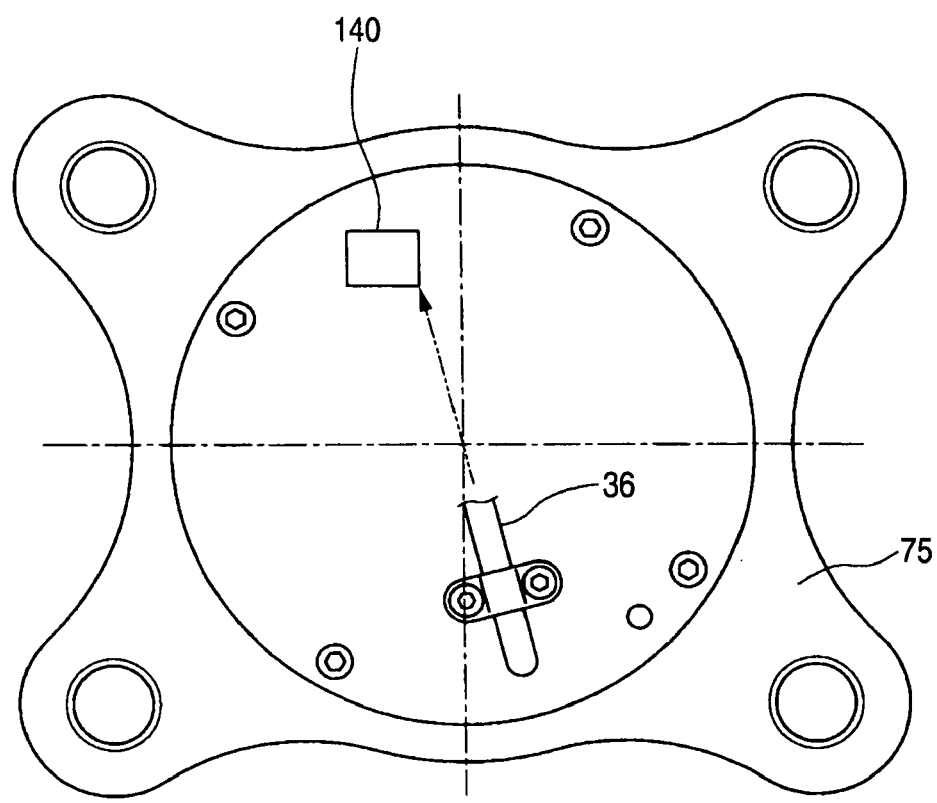
FIG. 24 is a view showing a connection structure between displacement detectors, and a signal processing section that is located opposite the displacement detectors with respect to a lid member.

FIG. 24 is a view showing a connection structure between the displacement detectors 70 and 71, and a signal processing section 140 that is located opposite the displacement detectors 70 and 71 with respect to the lid member 53. The signal processing section 140 is composed of an ECU and the like.

The sensor unit 10 has a signal processing section 140, and the respective displacement sensors 84t, 84b, 84f, 84r, 94t, 94b, 94f, and 94r are connected to the signal processing section 140 via signal lines 36 that pass through the lid member 53 of the case member 6. Output voltages (displacement detection values) obtained from the respective displacement sensors 84t, 84b, 84f, 84r, 94t, 94b, 94f, and 94r are calculated by an operation method to be described below in the signal processing section 140, and thereby, moment loads and translational loads in individual directions, which act on the wheel, are calculated.

Figure 25:
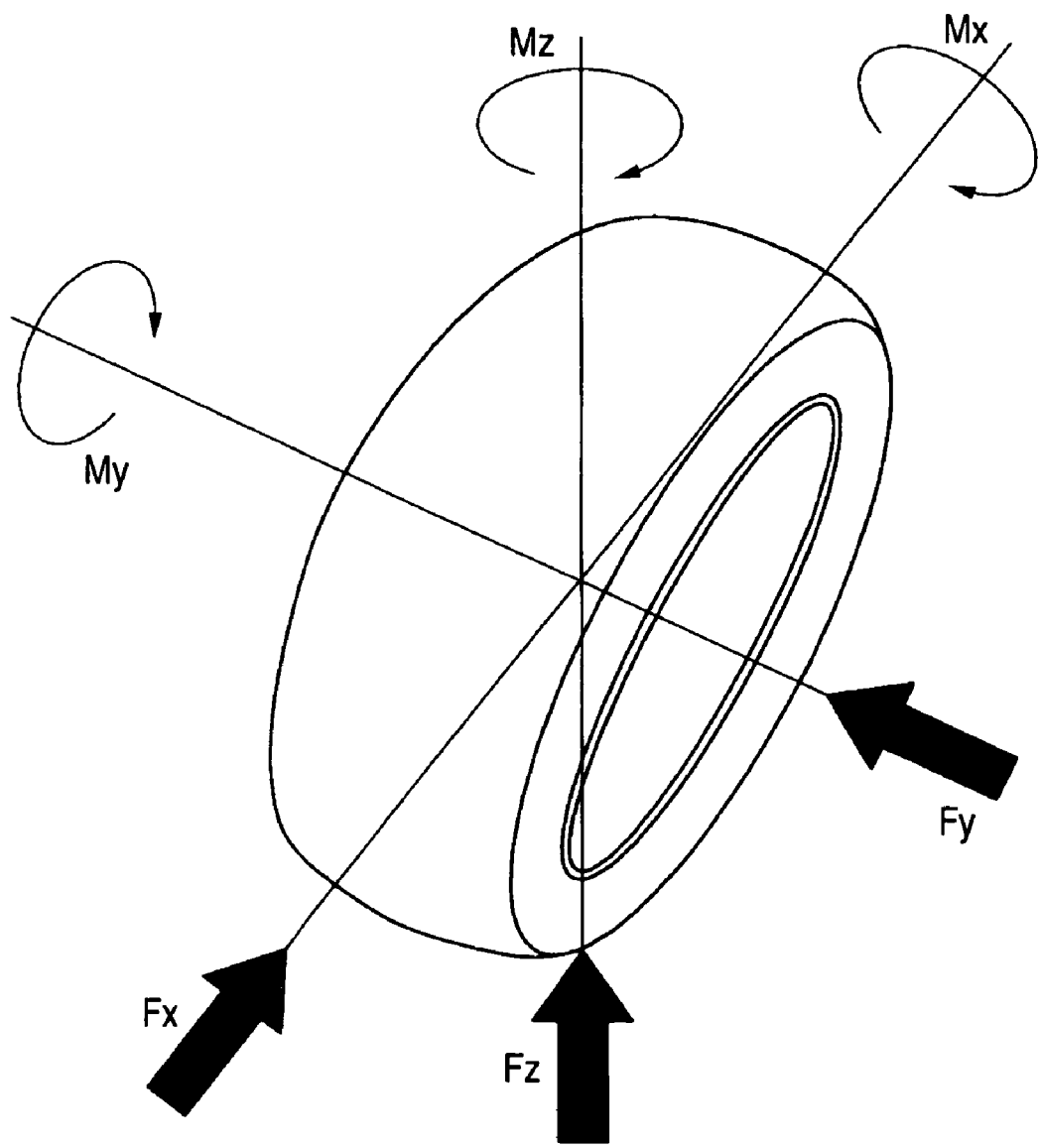
FIG. 25 is a view for explaining directions to be used in this embodiment.
Figure 26:
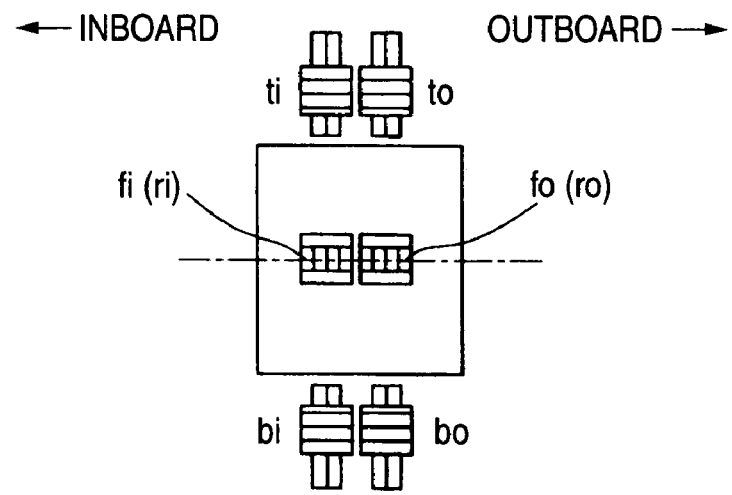
FIG. 26 is a view for explaining definitions of sensor displacement detection values to be used in this embodiment.
Figure 27:
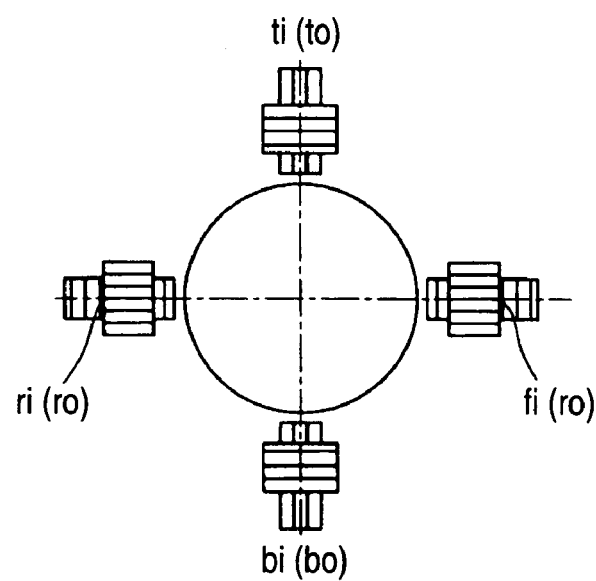
FIG. 27 is a view for explaining definitions of sensor displacement detection values to be used in this embodiment.

FIG. 25 is a view for explaining directions to be used in the second embodiment, and FIGS. 26 and 27 are views for explaining definitions of displacement detection values of the sensors to be used in the second embodiment. FIG. 26 is a view when the displacement sensors are seen from the radial outside, and FIG. 27 is a view when the displacement sensors are seen from the axial direction. In addition, in FIG. 27, two coil elements 100a and 100b (refer to FIG. 20) that are adjacent to each other in the circumferential direction are expressed as one coil element for the purpose of simplification.

As shown in FIG. 25, in the second embodiment, a front-and-rear horizontal direction of the wheel is defined as an x-axis direction, a right-and-left horizontal direction (axial direction) of the wheel is defined as a y-axis direction, and a vertical direction of the wheel is defined as a z-axis direction.

Further, as shown in FIGS. 26 and 27, a suffix "i" is used for displacement detection values of the four displacement sensors 84 on the inner side (center side of a vehicle body), and a suffix "o" is used for the four displacement sensors 94 on the outer side (wheel side).

Further, to explain it again for the purpose of confirmation, in a state where the hub unit is installed in a predetermined position, a sensor 84 installed in a position that substantially radially faces the foremost position of a vehicle to which the hub unit is attached in the target member 73 is defined as a sensor 84f ("f" is an abbreviation of "front"), a sensor 84 installed in a position that substantially radially faces the rearmost position of the vehicle to which the hub unit is attached in the target member 73 is defined as a sensor 84r ("r" is an abbreviation of "rear"), a sensor 84 installed in a position that substantially radially faces the portion of the target member 73 that is located on the vertical topmost side is defined as a sensor 84t ("t" is an abbreviation of "top"), and a sensor 84 installed in a position that substantially radially faces the portion of the target member 73 that is located on the vertical bottommost side is defined as a sensor 84b ("b" is an abbreviation of "bottom").

Further, in the following displacement detection values of sensors, a suffix "f" is used for a displacement detection value of a front sensor, a suffix "r" is used for a displacement detection value of a rear sensor, a suffix "t" is used for a displacement detection value of a top sensor, and a suffix "b" is used for a displacement detection value of a bottom sensor.

The fact shown in FIG. 27, i.e., the fact that the displacement sensors 84t, 84b, 84f, and 84r on the inner side substantially overlap the displacement sensors 94t, 94b, 94f, and 94r on the outer side axially matches the fact that the aforementioned first displacement detector 70 axially overlaps the second displacement detector 71.

To go back to the original topic, displacement detection values of a total of eight sensors of the sensor unit 10 are defined as follows.

fi: Displacement detection value of displacement sensor 84f ri: Displacement detection value of displacement sensor 84r ti: Displacement detection value of displacement sensor 84t bi: Displacement detection value of displacement sensor 84b fo: Displacement detection value of displacement sensor 94f ro: Displacement detection value of displacement sensor 94r to: Displacement detection value of displacement sensor 94t bo: Displacement detection value of displacement sensor 94b

Figure 28:
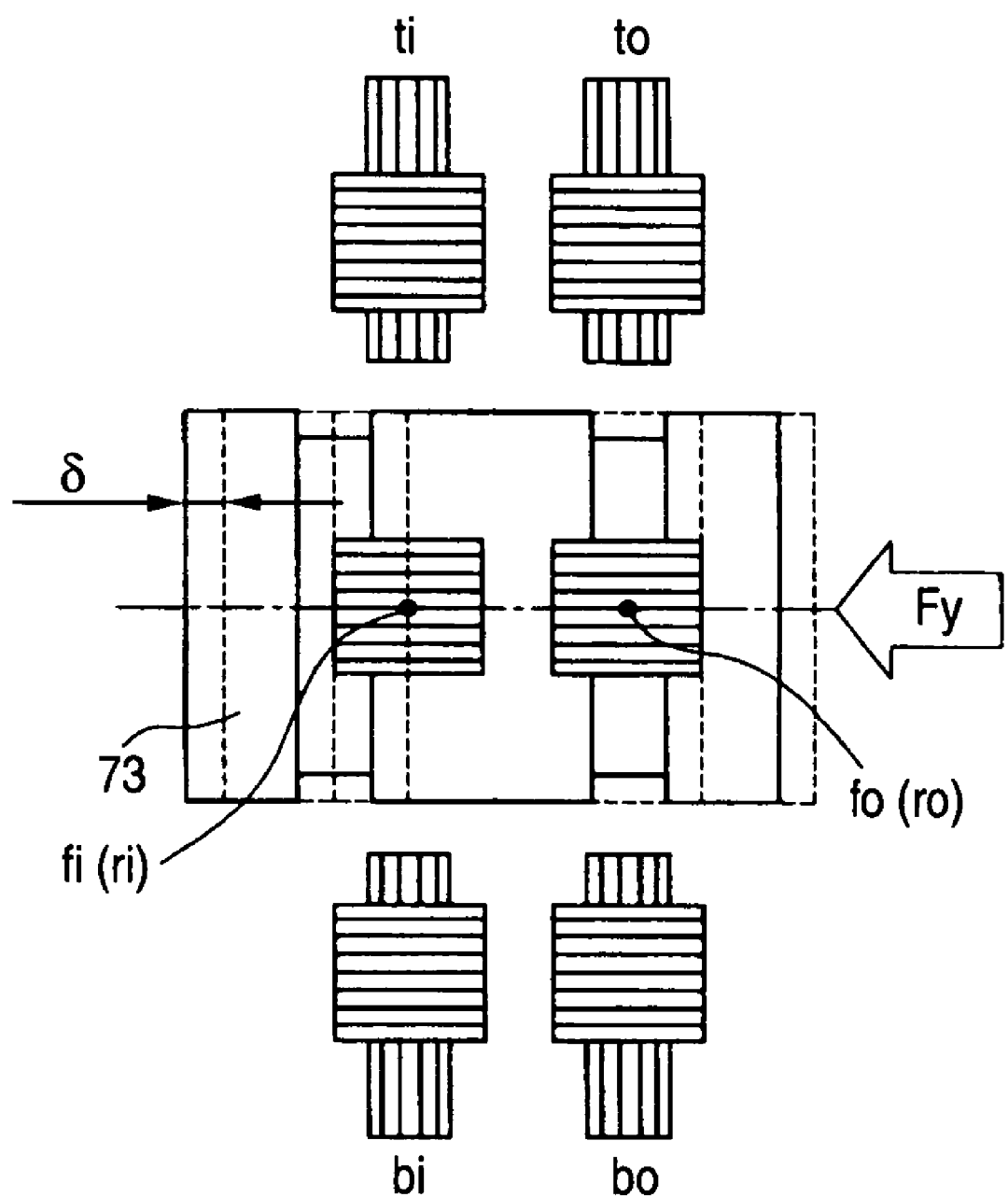
FIG. 28 is a view schematically showing the positional relationship between a target member and some displacement sensors in a case where a translational load Fy in a y-axis direction has acted on a wheel.

FIG. 28 is a view schematically showing the positional relationship between the target member 73 and some displacement sensors in a case where a translational load Fy in the y-axis direction has acted on the wheel. Hereinafter, an independent variable (sFy) corresponding to the translational load Fy in the y-axis direction will be explained with reference to FIG. 28.

As shown in FIG. 28, in a case where the translational load Fy in the y-axis direction has acted on the wheel, the second raceway member (rotating raceway member) is displaced in the direction of the load thereof, and the position of each of the annular grooves 134 and 135 is shifted axially. For this reason, as described above, all the displacement detection values (output voltages in the second embodiment) fi, ri, ti, and bi of the displacement sensors on the inner side decrease with an increase in axial travel distance δ, and all the displacement detection values (output voltages in the second embodiment) fo, ro, to, and bo of the displacement sensors on the outer side increase with an increase in axial travel distance δ.

Figure 29:
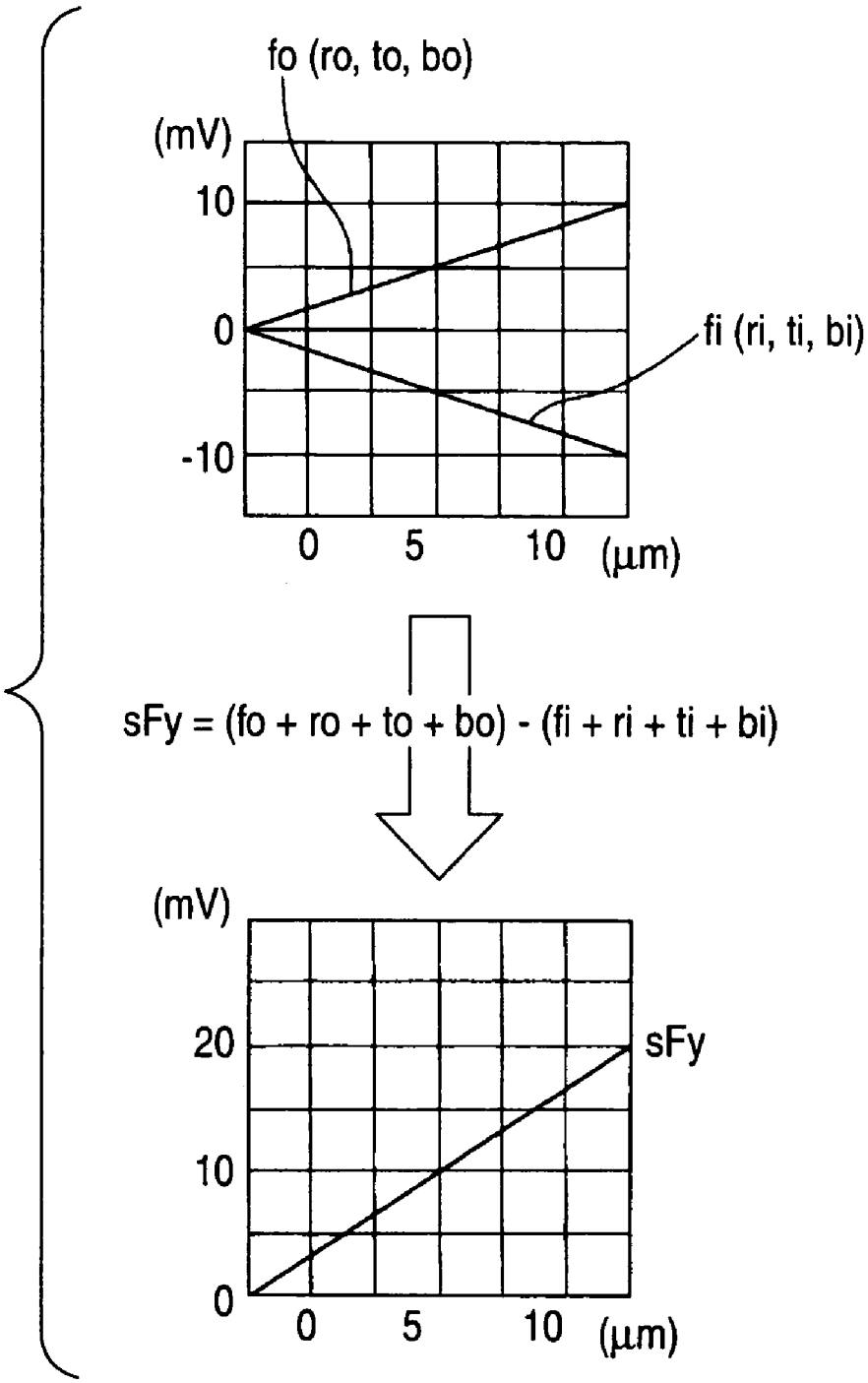
FIG. 29 is a matrix diagram showing the correspondence relationship between independent variables calculated from outputs of the respective displacement sensors, and actual loads that act on the wheel.

Thus, as shown in FIG. 29, i.e., a matrix diagram showing the correspondence relationship between independent variables calculated from outputs of the respective displacement sensors, and actual loads that act on the wheel, sFy calculated in the following Expression (1) is adopted as an independent variable corresponding to the translational load Fy in the y-axis direction.

$$sFy = (fi + ri + ti + bi) - (fo + ro + to + bo) \qquad (1)$$

As such, by taking differences between displacement detection values of the respective displacement sensors on the inner side and displacement detection values of the respective displacement sensors on the outer side, sFy to the axial unit translational amount of the second raceway member that is a rotating raceway ring is amplified. Thus, the detection sensitivity of the axial displacement as the whole sensor unit 10 can be enhanced.

Displacement detection values of displacement in the x-axis direction, and displacement detection values of displacement in the z-axis direction are found as follows.

As for the x-axis direction, a difference between a displacement detection value f of a front sensor and a displacement detection value r of a rear sensor is defined as a displacement detection value of displacement in the x-axis direction, and a difference between a displacement detection value t of a top sensor and a displacement detection value b of a bottom sensor is defined as a displacement detection value of displacement in the z-axis direction. Since temperature affects outputs of the front and rear sensors and outputs of the top and bottom sensors, respectively, by the same amount in the same direction, a temperature drift is eliminated by taking differences as described above.

In the second embodiment, displacement sensors 84t, 84b, 84f, 84r, 94t, 94b, 94f and 94r are arranged on the inner side and on the outer side. Thus, in respective positions on the inner side and on the outer side, as shown in the following Expression (2), displacement detection values of displacement in the x-axis direction and displacement detection values of displacement in the z-axis direction are acquired. Here, it goes without saying that the value of the following Expression (2) correspond to the output of the gap detecting circuit shown in FIG. 22.

Displacement detection value of displacement in x-axis direction on inner side: xi=fi−ri Displacement detection value of displacement in z-axis direction on inner side: zi=−ti+bi Displacement detection value of displacement in x-axis direction on outer side: xo=fo−ro Displacement detection value of displacement in z-axis direction on outer side: zo=−to+bo (2)

In addition, xi, xo, zi, and zo shown in the following Expressions (3) to (7) are not xi, xo, zi, and zo shown in the above Expression (2), but are xi', xo', zi', and zo' to be mentioned below. The terms xi', xo', zi', and zo' are detection values obtained by removing rotational synchronization components that are noises from the respective xi, xo, zi, and zo shown in Expression (2). The method of finding xi', xo', zi', and zo' will be explained in detail with reference to FIG. 37 and its subsequent drawings.

An independent variable (sMz) corresponding to a moment load Mz around the z-axis is found as follows.

Figure 30:
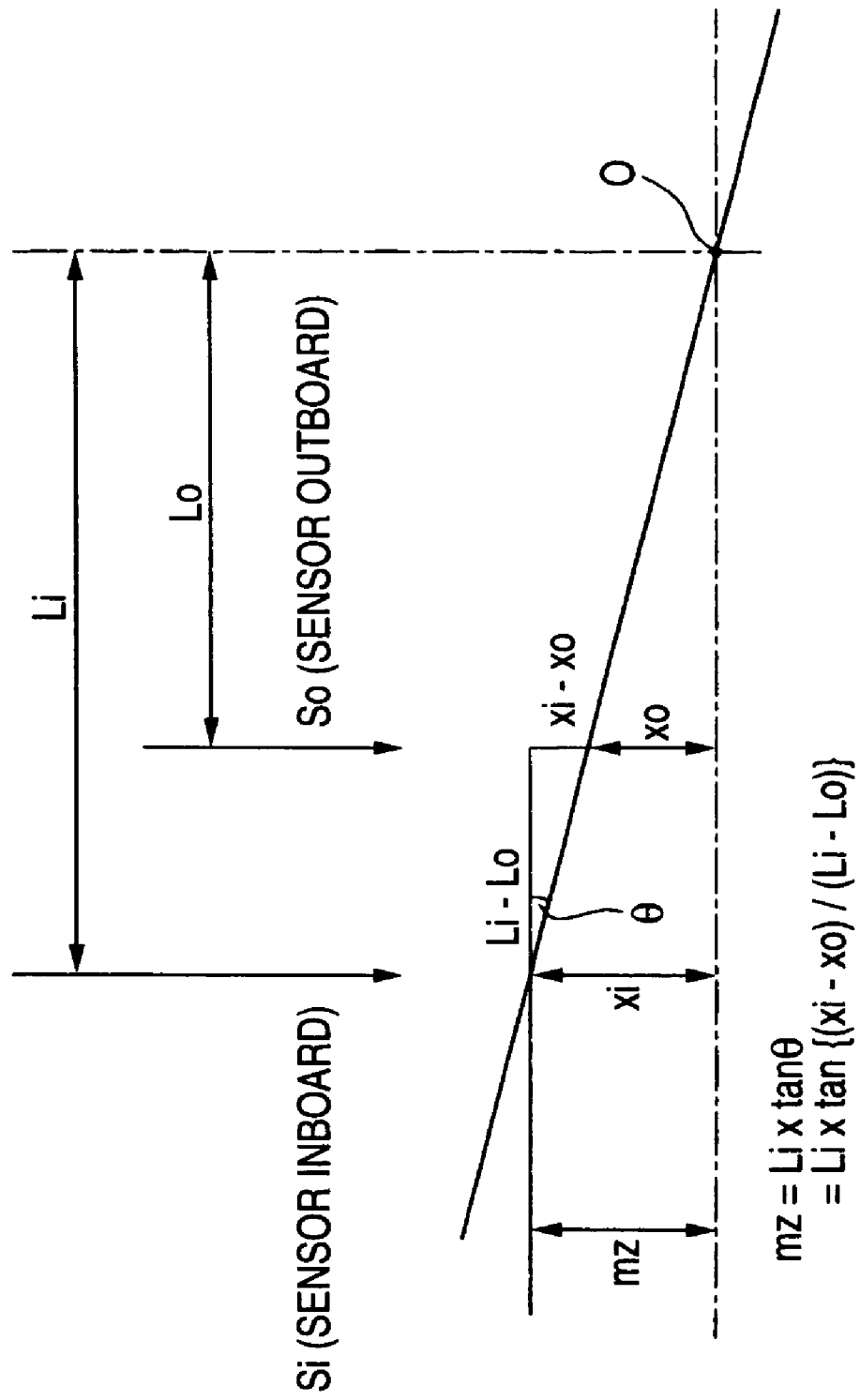
FIG. 30 is a view showing the relationship of various variables in the state of pure moment where only a moment load Mz around a z-axis acts.

FIG. 30 is a view showing the relationship of various variables in the state of pure moment where only the moment load Mz around the z-axis acts.

If the axial distance from the center O (refer to FIG. 18) of the bearing device to the detection position of a displacement sensor on the inner side is defined as "Li", and the axial distance from the center O of the bearing device to the detection position of a displacement sensor on the outer side is defined as "Lo", a displacement detection value corresponding to the moment load Mz around the z-axis is theoretically represented by mz calculated in the following Expression (3). As shown in FIG. 30, this "mz" coincides with xi, in a case where "θ" is sufficiently small.

$$Mz = Li \times \tan\theta \quad (3)$$
$$= Li \times \tan((xi - xo)/(Li - Lo))$$

However, in practice, the annular grooves 134 and 135 are formed in the target member 73. Therefore, as shown in FIG. 31, i.e., a view showing the relationship between Mz, and displacement detection values of mz and xi in a case where only the moment load Mz around the z-axis is made to act, mz does not coincides with xi, and mz also does not coincide with the inclination of the displacement detection value of xi.

For this reason, a correction coefficient obtained by dividing the inclination of an xi straight line denoted by kz in FIG. 32 by the inclination of an mz straight line is introduced. The independent variable sMz corresponding to the moment load Mz around the z-axis is obtained by multiplying mz by a correction coefficient kz in the following Expression (4).

$$sMz = -mz \times kz \quad (4)$$

In addition, in the Expression (4), a minus (−) sign on the right-hand side is provided to make it coincide with the signs of the other independent variables (the above sFy, the following sMx, etc.).

The independent variable (sMx) corresponding to the moment load Mx around the x-axis direction is found as follows.

The x-axis direction and the z-axis direction have a coordinate transformation relation of 90 degrees. Accordingly, the independent variable sMx corresponding to the moment load Mx around the x axis can be calculated by the following Expression (5), by according to the way of thinking similar to the case of the sMz.

$$sMx = mx \times kx \quad (5)$$

In addition, kx in the Expression (5) is a value defined in FIG. 32, is a correction coefficient introduced to the same effect as kz, and is a correction coefficient obtained by dividing the inclination of a zi straight line by the inclination of an mx straight line. This kx is calculated from a view showing the relationship between Mx, and displacement detection values of mx and zi in a case where only the moment load Mx around the x-axis is made to act, like 16.

An independent variable (sFz) corresponding to a translational load Fz in the z-axis direction, and an independent variable (sFx) corresponding to a translational load Fx in the x-axis direction are found as follows.

Figure 34:
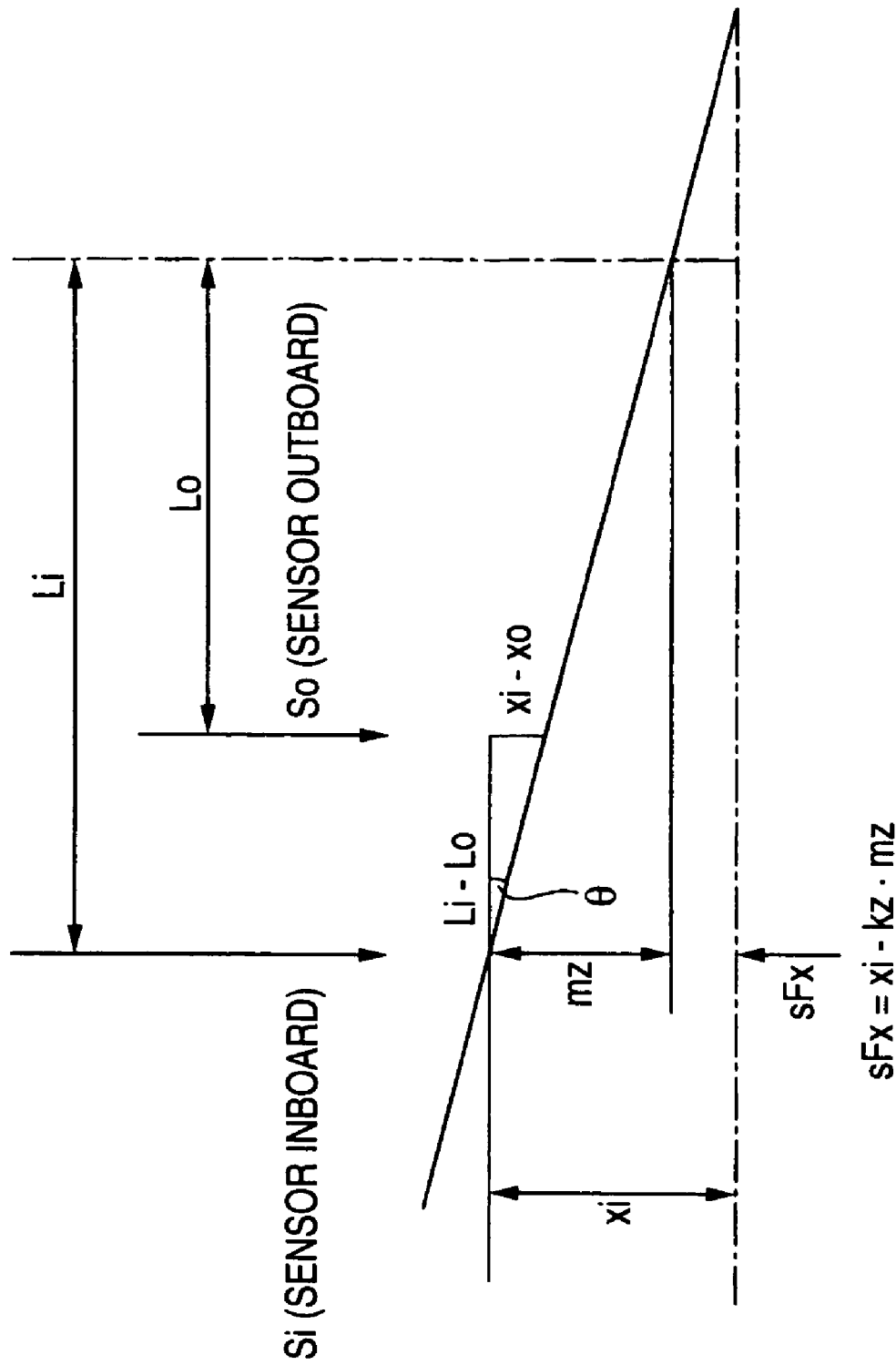
FIG. 34 is a view showing a deformed state of a second raceway member when the state where the translational load Fx in the X-axis direction along with the moment load Mz around the Z-axis acts is assumed.

FIG. 34 is a view showing a deformed state of the second raceway member when the state where the translational load Fx in the x-axis direction along with the moment load Mz around the z-axis acts is assumed, and is a view showing the relationship between various variables.

The component of the independent variable sMz corresponding to the moment load Mz around the z-axis direction, and the component of the independent variable sFx corresponding to the translational load Fx in the x-axis direction are included in included a displacement detection value xi of displacement in the x-axis direction on the inner side. The independent variable sFx corresponding to the translational load Fx in the x-axis direction can be found by subtracting Mz from the above "xi".

This is similarly applied to sFz that is an independent variable corresponding to the translational load Fz in the z-axis direction. Accordingly, the independent variable sFz by the translational load Fz in the z-axis direction and the independent variable sFx by the translational load Fx in the x-axis direction can be calculated by the following Expressions (6) and (7), respectively.

$$sFz = zi - mx \times kx \quad (6)$$

$$sFx = xi - mz \times kz \quad (7)$$

Figure 35:
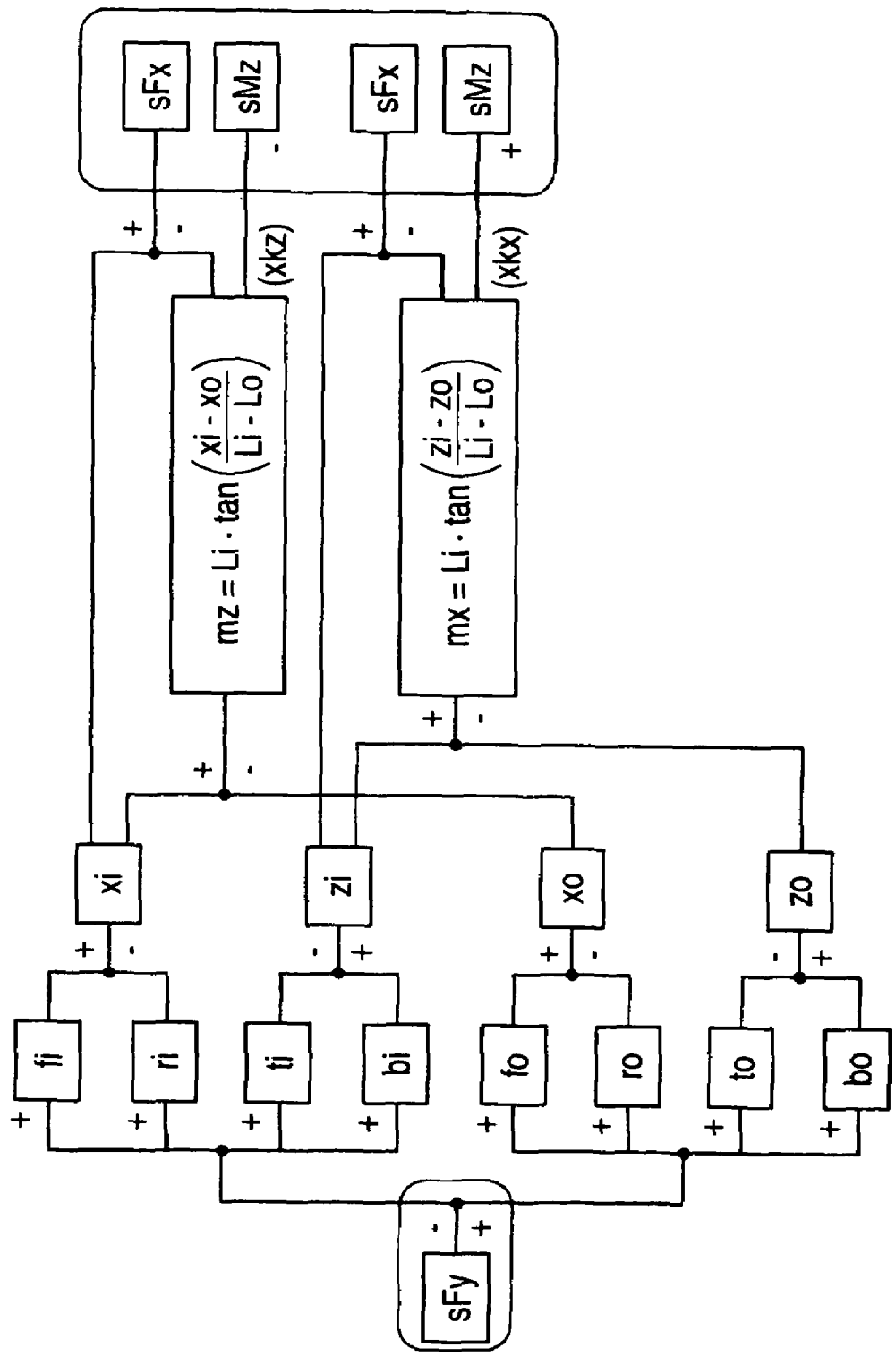
FIG. 35 is a view diagrammatically showing the method of calculating variables sFx, sFy, sFz, sMx, and sMz.

FIG. 35 is a view diagrammatically showing the method of calculating the variables sFx, sFy, sFz, sMx, and sMz, which has been explained hitherto. As shown in FIG. 35, sFy can first be found, and sFx, sFz, sMx, and sMz can be found on the basis of the value.

Figure 36:
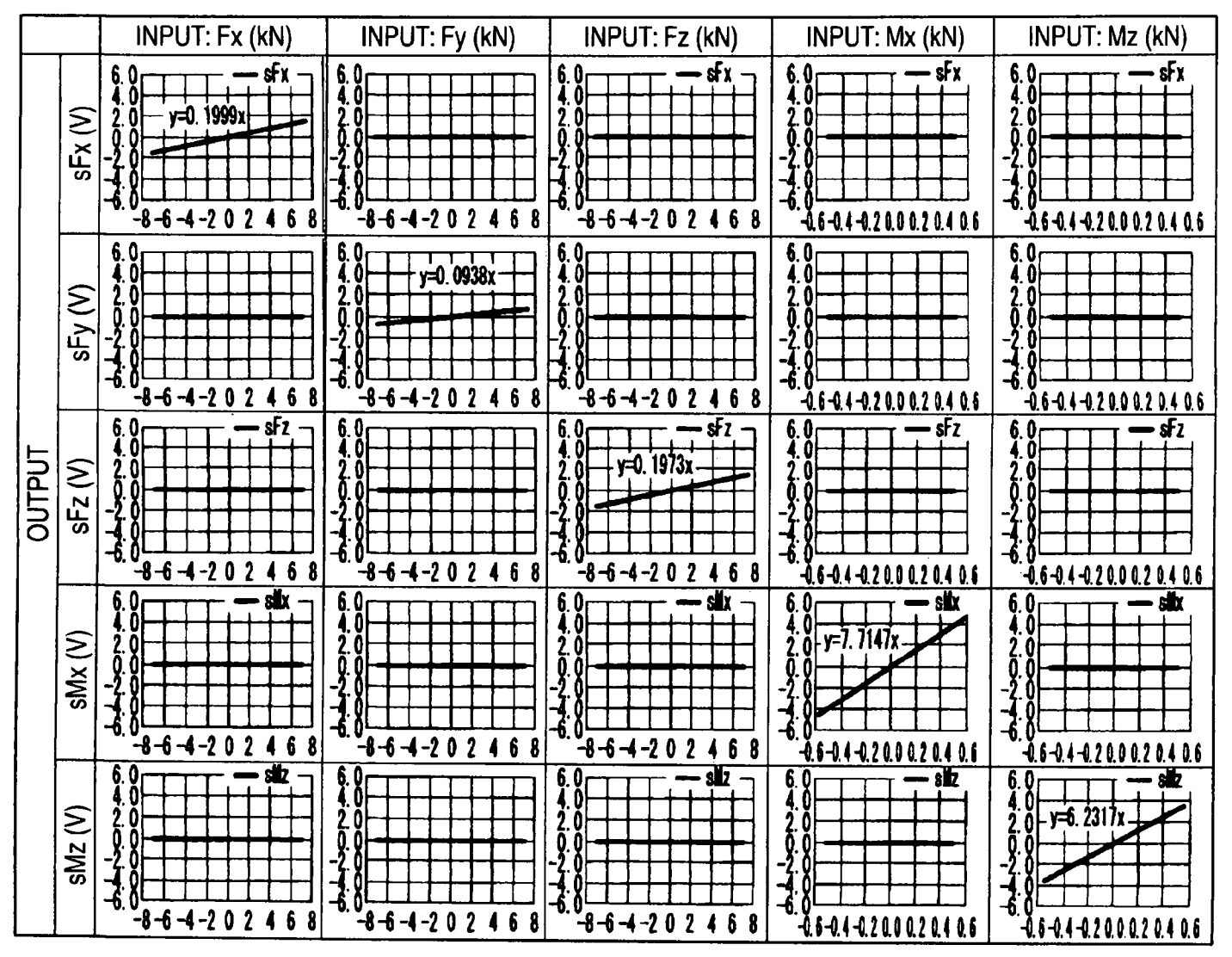

FIG. 36 is a matrix diagram showing the correspondence relationship between the respective independent variables sFx, sFy, sFz, sMx, and sMz, obtained by the above Expressions (1), (4), (5), (6), and (7), and Fx, Fy, Fz, Mx, and Mz that are actual loads that act on the wheel.

That is, using Fx, Fy, Fz, Mx and Mz that are actually loaded to the wheel as inputs, and using the respective independent variables sFx, sFy, sFz, sMx, and sMz obtained by the Expressions (1), (4), (5), (6), and (7) as outputs, a straight line graph between those variables is made into a matrix.

As shown in the matrix diagram of FIG. 36, as for Fx, only sFx becomes a straight line graph having inclination, the other Fy, Fz, Mx, and Mz have no response. Similarly to this, a diagonal portion of the matrix diagram becomes a straight line graph. Accordingly, these five independent variables sFx, sFy, sFz, sMx, and sMz are in a linear independent relationship among five components forces Fx, Fy, Fz, Mx, and Mz that are actual loads that act on the wheel.

For this reason, if those independent variables sFx, sFy, sFz, sMx, and sMz are found, the respective loads Fx, Fy, Fz, Mx, and Mz can be calculated by solving simultaneous linear equations with five unknowns that have as unknowns the five loads Fx, Fy, Fz, Mx, and Mz that act on the wheel.

In the second embodiment, an operational circuit (hardware) or a control program (software) that solves the aforementioned respective equations (1), (4), (5), (6), (7), and simultaneous linear equations with five unknowns are built into the signal processing section 140 composed of an ECU, etc. For this reason, the actual loads Fx, Fy, Fz, Mx, and Mz that act on the wheel can be found on the basis of the eight displacement detection values fi, ri, ti, bi, fo, ro, to, and bo by the respective-displacement sensors.

Figure 37:
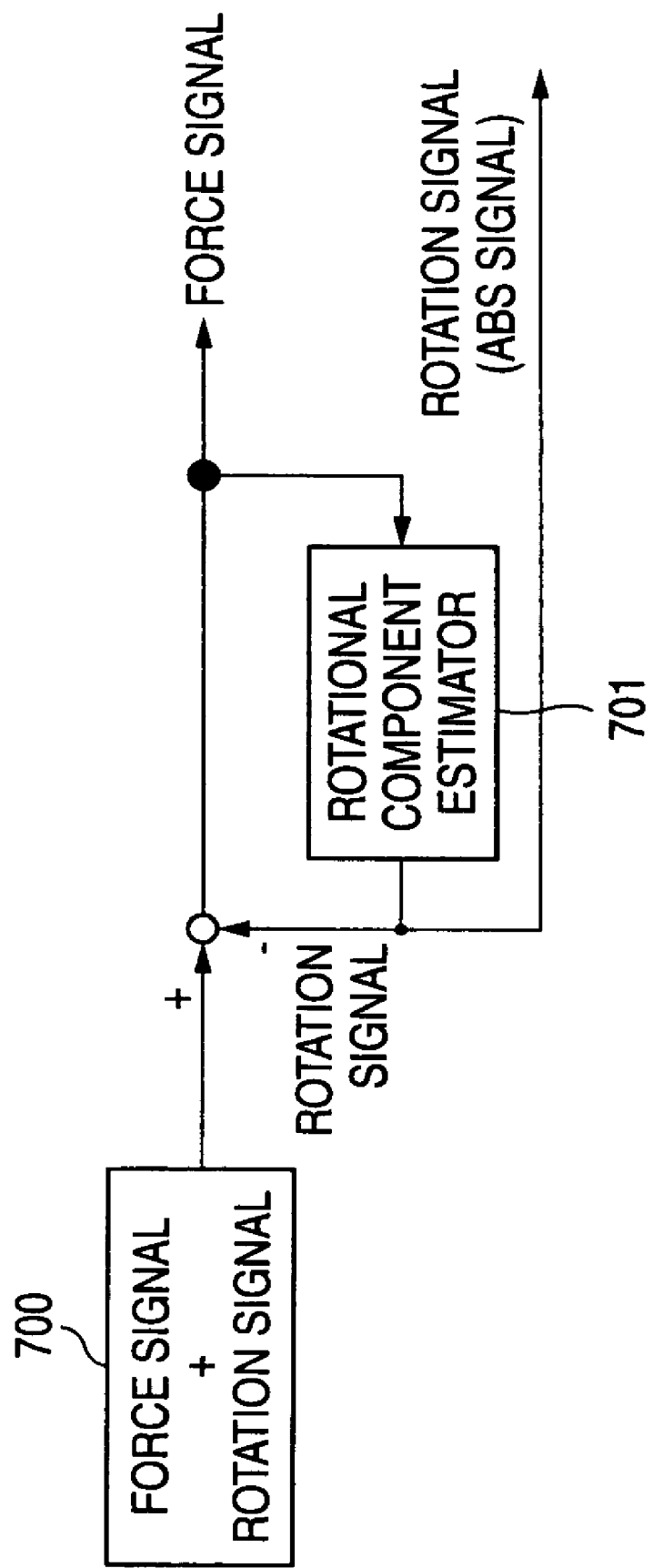
FIG. 37 is a view for explaining a mechanism that removes a rotational synchronization component from an output signal of the gap detecting circuit.

FIG. 37 is a view for explaining a mechanism that removes a rotational synchronization component from an output signal of the gap detecting circuit.

Rotational synchronization signals associated with the rotation of the inner shaft 1 are included in the above xi (xi=fi−ri) that is a displacement detection value of displacement in the x-axis direction on the inner side, the above zi (zi=−ti+bi) that is a displacement detection value of displacement in the z-axis direction on the inner side, the above xo (xo=fo−ro) that is a displacement detection value of displacement in the x-axis direction on the outer side, and the above zo (zo=−to+bo) that is a displacement detection value of displacement in the z-axis direction on the outer side, and the rotational synchronization signals become noises of load signals (displacement signals).

Accordingly, it is necessary to remove rotational synchronization signal components that are noises from the above four displacement detection values. In the second embodiment, the rotational synchronization signals are removed from the above xi, zi, xo, and zo, and more correct load signals (displacement signals) are extracted from the above xi and zi. Further, in this embodiment, in addition to removing the rotational synchronization signals from the above xi, zi, xo, and zo, an ABS signal is generated on the basis of the rotational synchronization signals.

Hereinafter, a mechanism that removes rotational synchronization signals from the above xi and zi, and a mechanism that generates an ABS signal on the basis of the rotational synchronization signals will be explained in detail with reference to FIG. 37 and the following FIGS. 38 to 42.

In addition, although not described, rotational synchronization components are removed by the same method even from the above xo (xo=fo−ro) that is a displacement detection value of displacement in the x-axis direction on the outer side, and the above and the above zo (zo=−to+bo) that is a displacement detection value of displacement in the z-axis direction on the outer side.

As shown in FIG. 37, signals (specifically, xi and zi of the above Expression (2)) including a force signal and a rotation signal are output to a rotational component estimator 701 as an example of a rotation-signal extractor, and rotational synchronization components (x3, y3) are extracted in the rotational component estimator 701. From this, a rotational synchronization component that is a noise can be excluded from xi by subtracting x3 from xi, and by subtracting z3 from zi, and a rotational synchronization component that is a noise can be excluded by subtracting z3 from zi.

Further, an ABS signal is obtained by binarizing the rotational synchronization components as pulse signals after it is determined whether the components are higher or lower than a predetermined threshold as a boundary.

Figure 38:
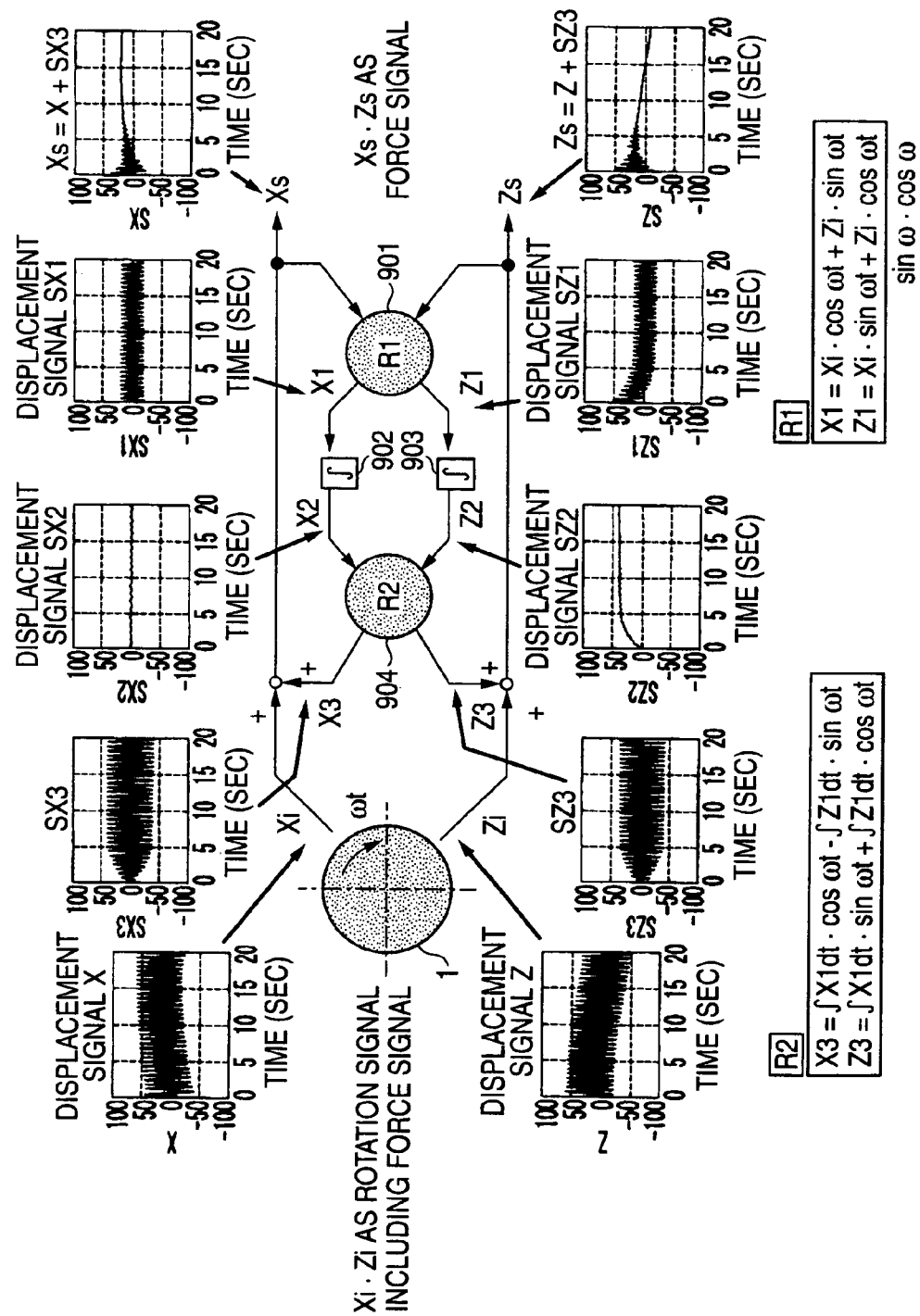
FIG. 38 is a view showing a mechanism of extraction of rotational synchronization components, in a rotational component estimator.
Figure 39:
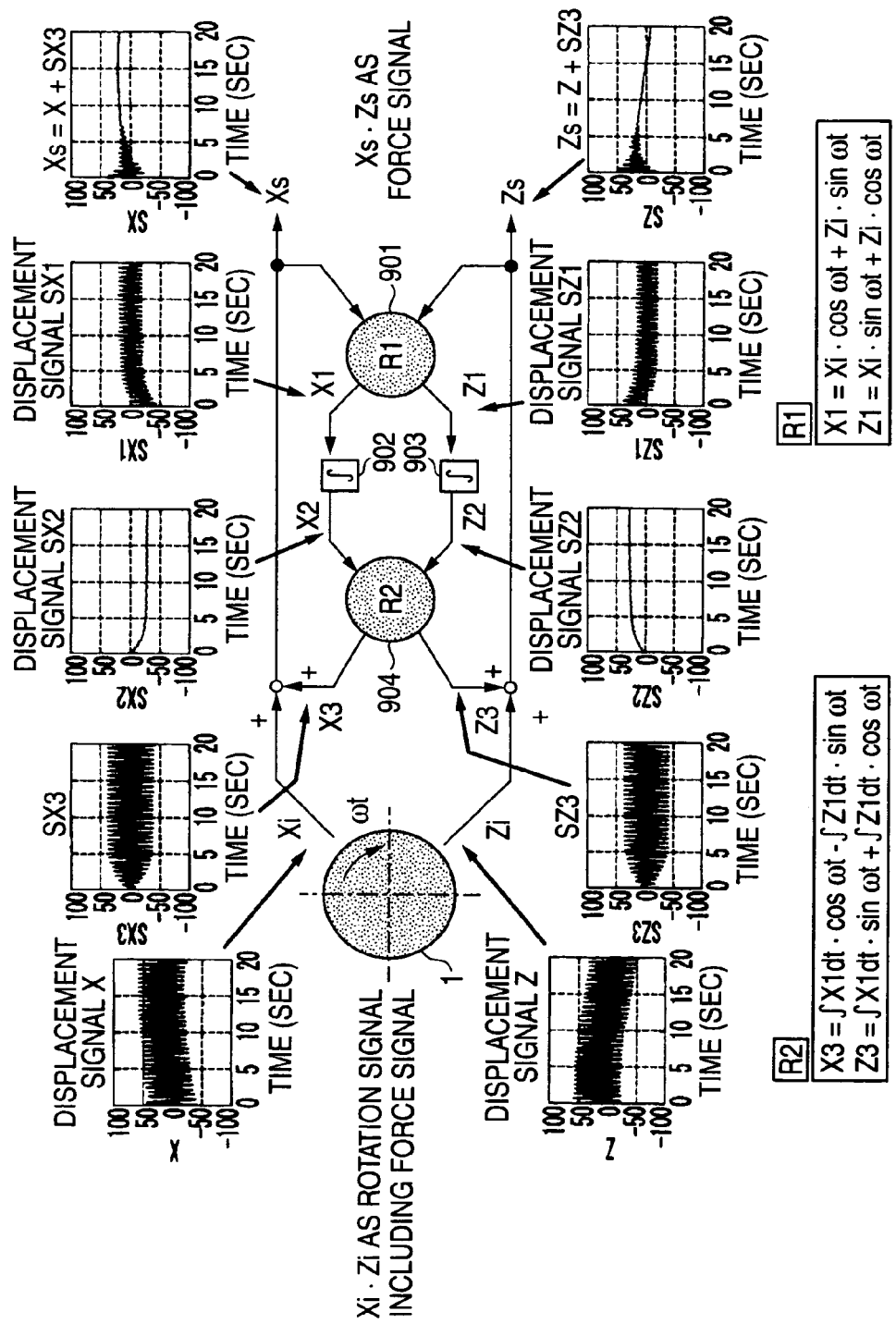
FIG. 39 is a view showing a mechanism of extraction of rotational synchronization components, in the rotational component estimator.
Figure 40:
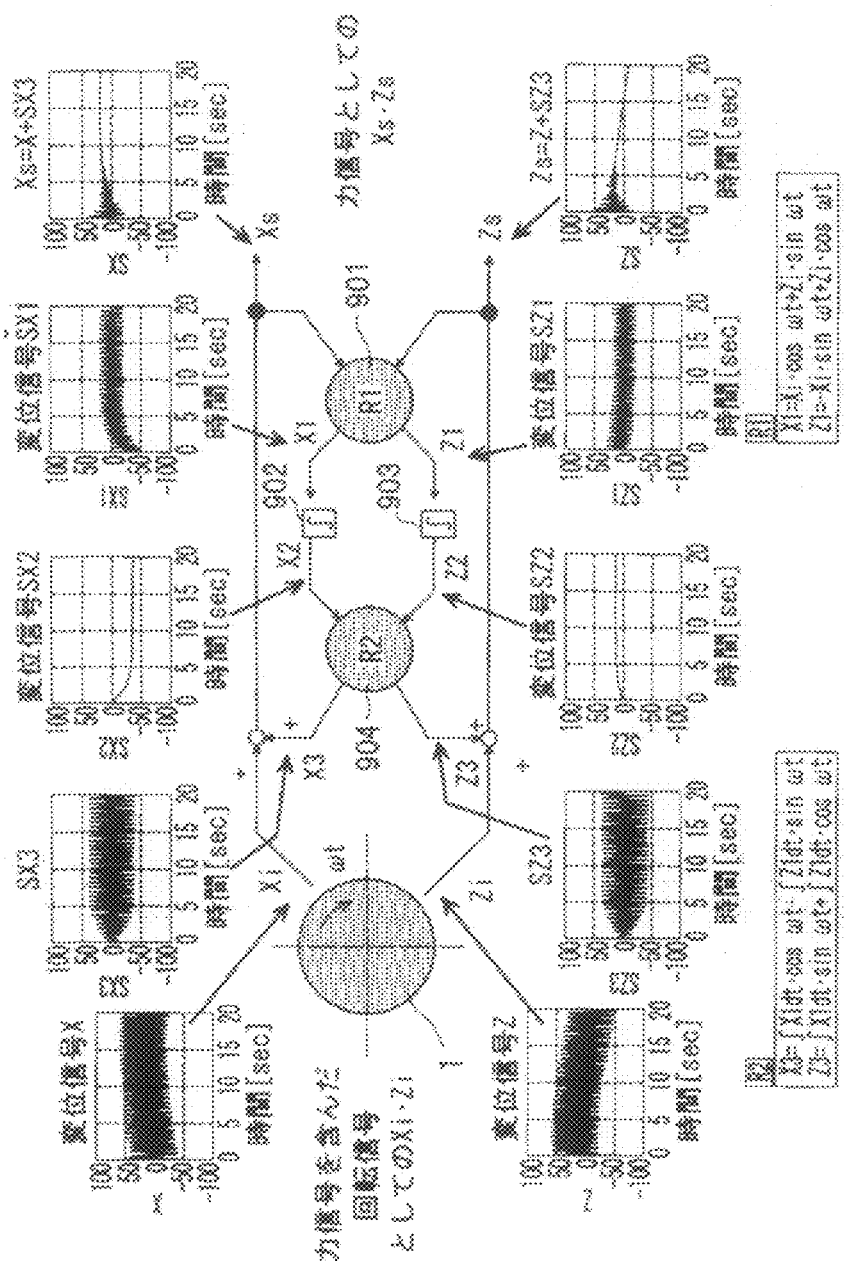
FIG. 40 is a view showing a mechanism of extraction of rotational synchronization components, in the rotational component estimator.
Figure 41:
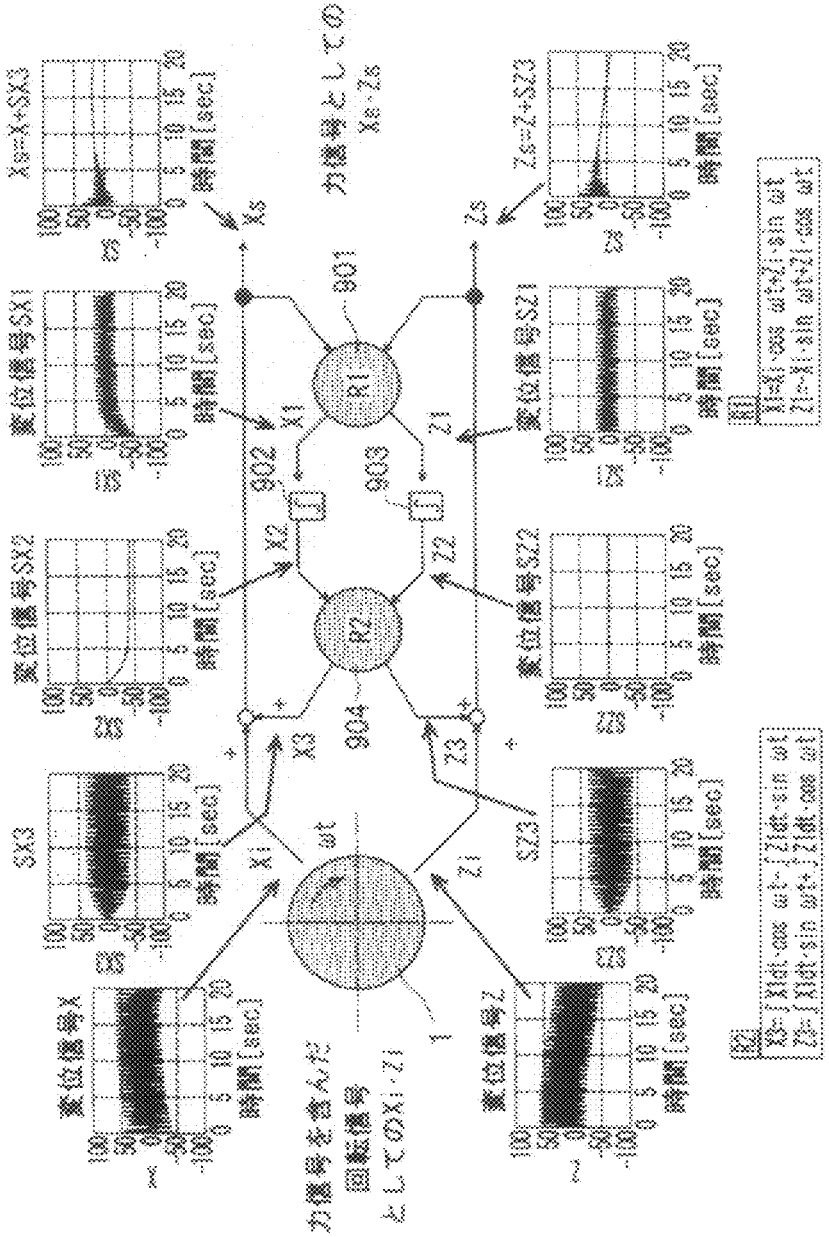
FIG. 41 is a view showing a mechanism of extraction of rotational synchronization components, in the rotational component estimator.
Figure 42:
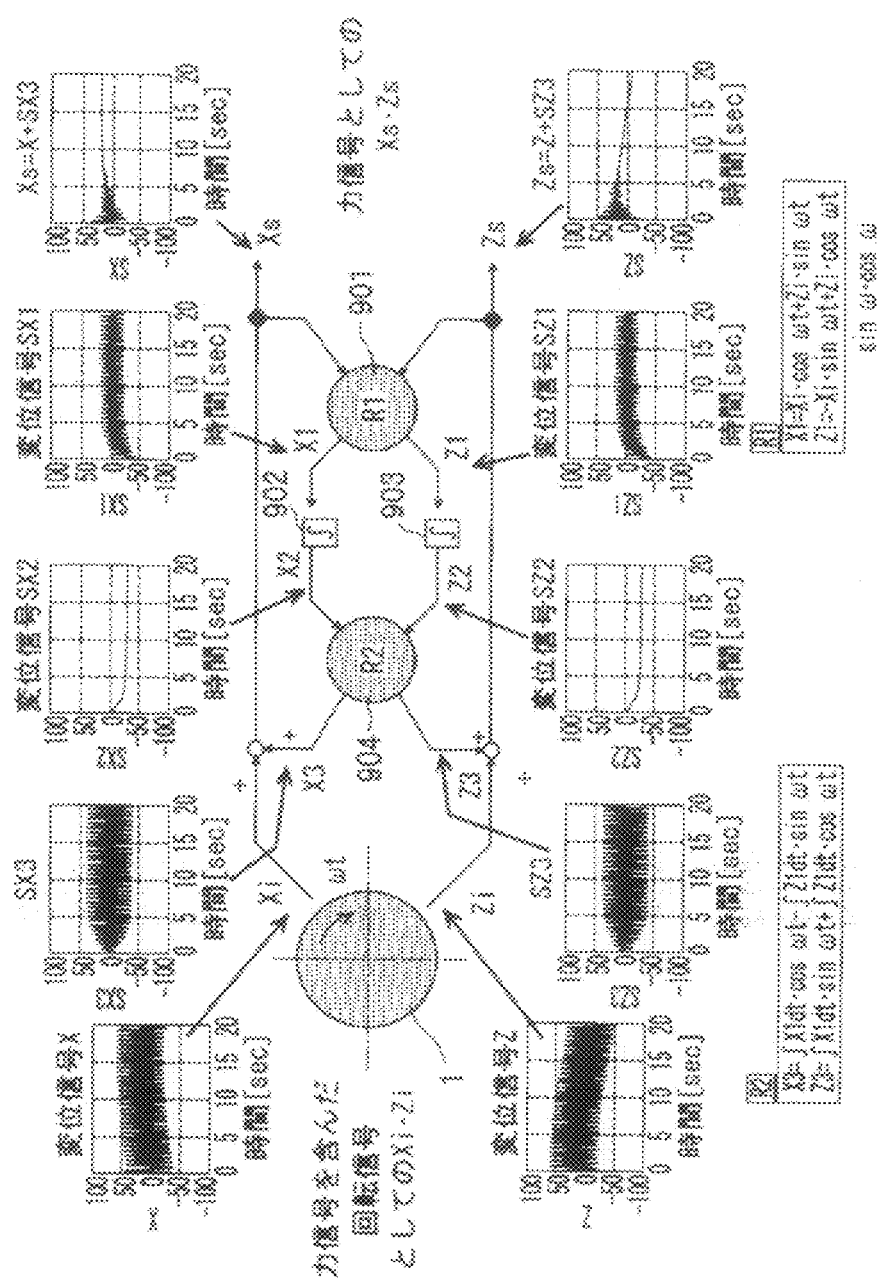
FIG. 42 is a view showing a mechanism of extraction of rotational synchronization components, in the rotational component estimator.

FIG. 38 is a view showing a mechanism of extraction of rotational synchronization components, in the rotational component estimator 701. In addition, in FIG. 38, the phase difference 0 indicates the phase difference between an orthogonal coordinate system set in the inner shaft 1, and a rotating coordinate system of a first calculator 901 to be described below is 0.

The rotational component estimation person 701 has the first calculator 901, a second calculator, and a third calculator 904, and the second calculator is composed of a first integrator 902 and a second integrator 903.

First, in the first calculator 901, using the above xi and zi that are input signals including rotational synchronization components as a two-dimensional vector (xi, zi), R1 operation corresponding to the rotational operation of −Ωt that is shown in the following Expression (8) is performed on the two-dimensional vector (xi, zi). Here, each of xi and zi is composed of a sum of a rotational synchronization component and a non-rotational synchronization component that change with Ωt.

$$\begin{pmatrix} x1 \\ z1 \end{pmatrix} = \begin{pmatrix} \cos \omega t & \sin \omega t \\ -\sin \omega t & \cos \omega t \end{pmatrix} \begin{pmatrix} xi \\ zi \end{pmatrix} \quad (8)$$

$$= \begin{pmatrix} \cos(-\omega t) & -\sin(-\omega t) \\ \sin(-\omega t) & \cos(-\omega t) \end{pmatrix} \begin{pmatrix} xi \\ zi \end{pmatrix}$$

The two-dimensional vector (x1, z1) that is an output of R1 operation indicates a displacement signal as seen from the rotating coordinate system that rotates with the same rotation as a body of rotation (specifically, the displacement-detected portion). This signal becomes a signal that has swung for the non-rotational synchronization component. This signal component has the same frequency as the rotation synchronizing frequency, and has an amplitude component of a non-rotational synchronization component as seen from the X direction or the Z direction.

Here, although not explained in full detail, the rotational speed of the displacement-detected portion, i.e., the rotational speed of the inner shaft 1, is calculated, for example, by forming a recess in one circumferential place of the inner shaft 1 and detecting the recess by at least one of the first displacement detector 70 and the second displacement detectors 71. Here, it should be noted that the rotational speed of the inner shaft 1 is not an ABS signal representing an instantaneous rotational speed in the rotation of the inner shaft 1 at each phase angle in the circumferential direction. This is because the rotational speed of the inner shaft 1 is not a signal representing an instantaneous rotational speed in the rotation of the inner shaft 1 at each phase angle in the circumferential direction.

Next, as shown in the following Expression (9), x2 is calculated by time-integrating x1 by the first integrator 902, z2 is calculated by time-integrating z1 by the second integrator 903. In this way, an x 1 signal is converted into an x 2 signal, and a z 1 signal is converted into a z 2 signal.

$$\begin{pmatrix} x2 \\ z2 \end{pmatrix} = \begin{pmatrix} \int x1 dt \\ \int z1 dt \end{pmatrix} \quad (9)$$

Output signals x2 and z2 of the first and second integrators 902 and 903 having x1 and z1 as inputs become signals having the information on how much phase difference and amplitude the rotational synchronization components of xi and zi have with respect to a rotating coordinate signal as seen from the rotating coordinate system synchronized with rotation. Although the outputs of the first integrator 902 and the second integrator 903 are determined in control time by the gains of the integrators, they will converge on a constant value when a certain period has passed.

Finally, in the third calculator 904, using the above x2 and z2 as a two-dimensional vector (x2, z2), R2 operation corresponding to the rotational operation of Ωt that is shown in the following Expression (10) is performed on the two-dimensional vector (x2, z2).

$$\begin{pmatrix} x3 \\ z3 \end{pmatrix} = \begin{pmatrix} \cos \omega t & -\sin \omega t \\ \sin \omega t & \cos \omega t \end{pmatrix} \begin{pmatrix} x2 \\ z2 \end{pmatrix} \quad (10)$$

R2 operation corresponds to outputting an X-direction component or Z direction component as seen from a fixed coordinate system, on the basis of the phase difference information and amplitude information. A signal (x3, y3) corresponds to a signal component that is obtained by extracting only a rotational synchronization signal in an opposite phase.

(xs, zs) is calculated by adding this (x3, z3) to (xi, zi). This (xs, zs) is nothing but (xi', yi'), and is (xi, zi) represented in the above Expressions (4) to (7). In addition, the technique of finding (xo', yo') from (xo, yo) is also the same as the technique of finding (xi', yi') from (xi, yi).

The calculator that adds (x3, z3) to (xi, zi) to calculate (xs, zs) constitutes a displacement signal calculator.

FIGS. 39 to 42 are different from the embodiment shown in FIG. 38 in that the phase differences between the orthogonal coordinate system (for example, the orthogonal coordinate system is positioned with respect to the recess provided in one circumferential place of the inner shaft 1) set in the inner shaft 1, and a rotating coordinate system of the first calculator 901 to be described below are not 0, but are π/4, 3π/8, 7π/2, and 3π/4.

As shown in FIGS. 38 to 42, the phase difference between the orthogonal coordinate system set in the inner shaft 1 and the rotating coordinate system of the first calculator 901 to be described below does not have an affect on extraction of load signals at all. Accordingly, the rotating coordinate system can be freely set.

According to the rolling bearing device of the above embodiment, the first displacement detector 70 and the second displacement detector 71 that are spaced axially from each other are provided. Therefore, not only translational loads based on axial translational displacement can be calculated on the basis of a detection signal of the first displacement detector 70, and a detection signal of the second displacement detection signal 71, but also changes in displacement depending on the axial position of the rolling bearing device can be detected, and moment loads that act on the rolling bearing device can be calculated on the basis of the change in displacement.

Further, according to the rolling bearing device of the above embodiment, a rotational synchronization component of the inner shaft 1 relative to the outer ring 3 can be extracted by the rotational component estimator 701 as a rotation-signal extractor from each of a signal output by the first displacement detector 70 and a signal output by the second displacement detector 71. Therefore, in the displacement signal calculator, the rotational synchronization components can be removed from the output of the first displacement detector 70, and the output of the second displacement detector 71. Accordingly, loads (translational loads or rotational loads) applied to the rolling bearing device can be detected with high precision.

Further, according to the rolling bearing device of the above embodiment, the rotational speed during a short time at a radial phase angle of the inner shaft 1 with respect to the outer ring 3 can be detected by finding a local frequency at a radial phase angle of the rotational synchronization components extracted by the rotational component estimator 701. Accordingly, since the sensor unit 10 is made to function as an ABS sensor, an ABS signal can be detected at low cost.

Further, according to the rolling bearing device of the above embodiment, extraction of a rotational synchronization component can be performed using rotational operation and integration operation by the rotational component estimator 701. Therefore, extraction of a rotational synchronization component can be extracted with high precision.

In the hub unit of the above embodiment, the displacement detectors 70 and 71 are fixed to the case member 6. However in the invention, the displacement detectors may be directly attached to the outer ring.

Further, in the rolling bearing device of the embodiment, the displacement-detected portion is the outer peripheral surface of the target member 73 that is separate from the inner shaft 1. In the invention, however, the displacement-detected portion may be a portion of an outer peripheral surface of the inner shaft, not the target member. Further, in the rolling bearing device of the embodiment, the inner ring 2 that is separate from the inner shaft 1 is adapted to fit to the inner shaft 1. However, in the invention, the second raceway member may be constituted by only the inner shaft, not the inner ring, or may be constituted by the inner shaft and the target member, and the inner shaft may have two raceway surfaces on the outer peripheral surface of the inner shaft.

Further, in the rolling bearing device of the embodiment, the outer ring 1 constitutes a fixed raceway member, and the inner shaft 2 and the like on the inner circumferential side constitutes a rotating raceway member. However, the inner shaft and the like on the inner circumferential side may constitute the fixed raceway member, and the outer ring may constitute the rotating raceway member.

Figure 43:
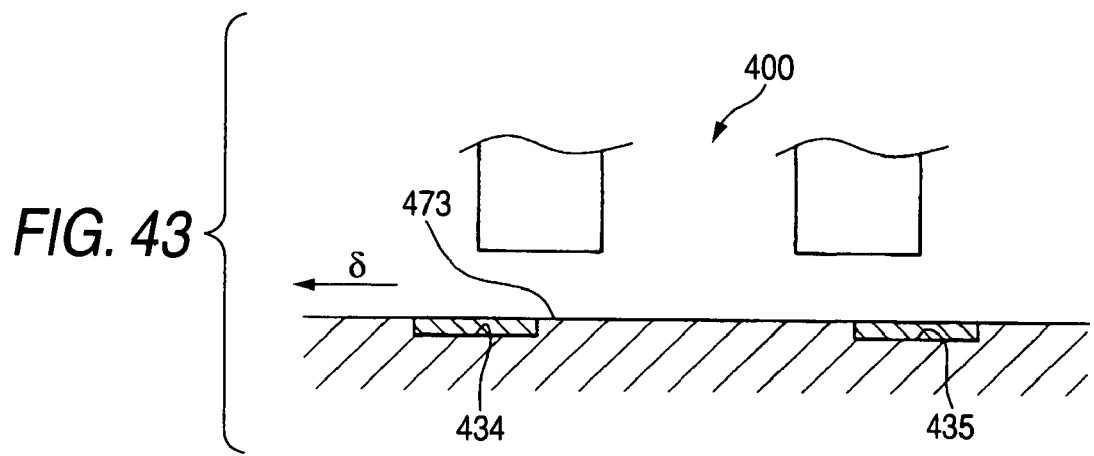
FIG. 43 is a schematic diagram for explaining a sensor unit that can be used in the invention.
Figure 44:
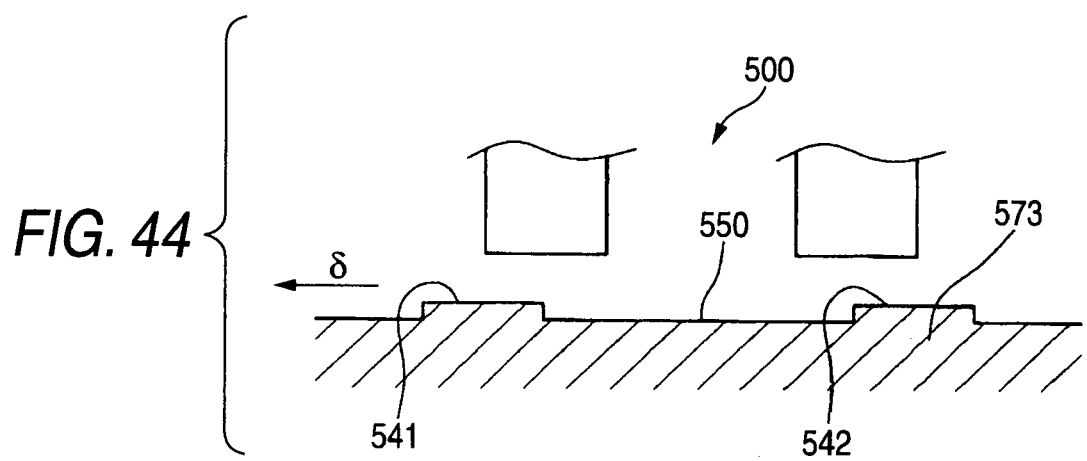
FIG. 44 is a schematic diagram for explaining a sensor unit that can be used in the invention.
Figure 45:
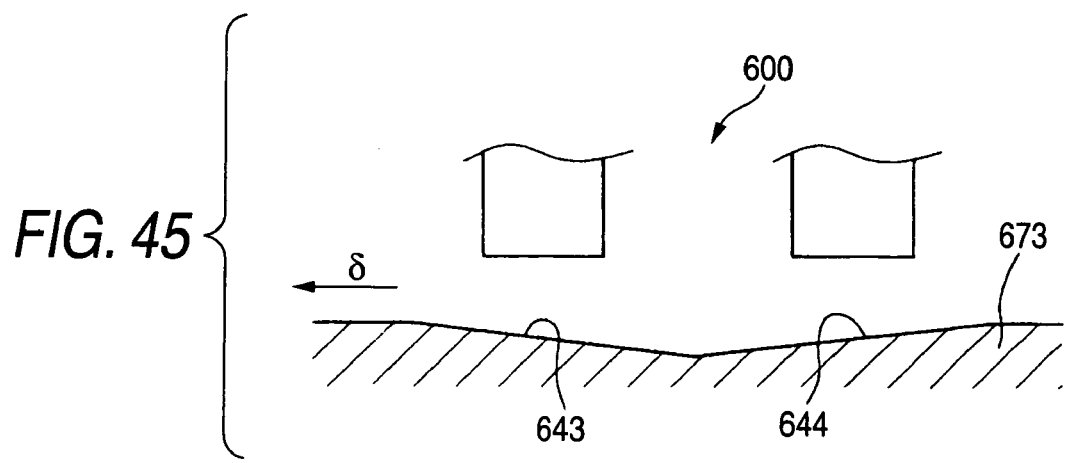
FIG. 45 is a schematic diagram for explaining a sensor unit that can be used in the invention.

Further, the sensor unit that can be used in the invention is not limited to the sensor unit 10 used in the above embodiment, and may be sensor units whose portions are shown in FIGS. 43, 44 and 45.

Specifically, like a sensor unit 400 shown in FIG. 43, the annular grooves 134 and 135 may not be formed in the target member 473, but annular striped portions 434 and 435 that have larger (or smaller) permeability than its surrounding constituent material may be formed in positions where the annular grooves 134 and 135 existed. The annular striped portions 434 and 435 can be formed by changing carbon content in the case of, for example, steel.

Further, like a sensor unit 500 shown in FIG. 44, convex portions 541 and 542 whose outer peripheral surfaces are cylinder surfaces may be formed in the positions of the target member 573 where the annular grooves 134 and 135 were formed in the above embodiment, and an annular portion 550 the external diameter of a hill portion of which is smaller than the convex portions 541 and 542 may be formed in the position where the annular portion 150 was formed.

Further, like a sensor unit 600 shown in FIG. 45, inclined portions 643 and 644 the directions of inclination of which are opposite to each other in an axial section may be formed on an outer peripheral surface of a target member 673, and an annular portion having a groove may be formed in a portion of each of the inclined portions 643 and 644. In addition, although FIG. 45 shows that joined portions of both the inclined portions 643 and 644 are formed in the shape of a valley, the joined portions may be formed as both inclined portions that are formed in the shape of a chevron.

Further, the sensor unit that can be used in the invention is not limited to the inductance-type displacement sensor that has been described in the embodiment. That is, the sensor unit that can be used in the invention may be any kinds of displacement sensors as long as they are non-contact-type sensor units that can detect a gap.

Further, in the above embodiment, the rolling bearing device is a hub unit. However, the rolling bearing devices with a sensor of this invention is not limited the hub unit, and may be any kinds of bearing devices, such as a magnetic bearing device, other than the hub unit. This is because it is needless to say that the configuration of the invention described in the embodiment can be applied to various bearing devices with the needs for measuring a plurality of moment loads or translational loads.

Further, in the rolling bearing device of the above embodiment, the rolling elements of a rolling bearing with a sensor to be manufactured are balls. However, in the invention, the rolling elements of the rolling bearing with a sensor to be manufactured may be rollers or may include rollers and balls.

What is claimed is:

1. A rolling bearing device with a sensor comprising:
    a first raceway member including a peripheral surface having a raceway surface;
    a second raceway member including a peripheral surface having a raceway surface and an annular displacement-detected portion;
    rolling elements arranged between the raceway surfaces of the first and second raceway members;
    a sensor unit that detects radial displacement and axial displacement of the displacement-detected portion; and
    a calculator,
    wherein the sensor unit includes:
        a first displacement detector including a detection surface that radially faces the displacement-detected portion;
        a second displacement detector located at a distance axially from the first displacement detector, and including a detection surface that radially faces the displacement-detected portion,
    wherein the first displacement detector and the second displacement detector substantially axially overlap each other, and each of the first displacement detector and the second displacement detector includes four displacement sensors arranged at substantially regular intervals in a circumferential direction,
    wherein the calculator calculates translational loads that act on the displacement-detected portion, and moment loads that act on the displacement-detected portion on the basis of
    fi–ri,
    ti–bi,
    fo–ro,
    to–ro, and
    a value that is obtained by subtracting from an output of one sensor of the first displacement detector an output of one sensor of the second displacement detector that substantially overlaps the one sensor axially, or a value that is obtained by subtracting from the sum of outputs of a plurality of sensors of the first displacement detector the sum of outputs of a plurality of sensors of the second displacement detector that substantially overlap the plurality of sensors axially,
    where outputs of the four sensors of the first displacement detector are represented by fi, ri, ti, and bi, respectively, and outputs of the four sensors of the second displacement detector are represented by fo, ro, to, and bo, respectively, and
    where fi and ri are outputs of two sensors of the first displacement detector located substantially line-symmetrically with respect to a central axis of the second raceway member, ti and bi are outputs of the other two sensors of the first displacement detector located substantially line-symmetrically with respect to the central axis of the second raceway member, fo is an output of a sensor that substantially overlaps the sensor outputting fi axially, ro is an output of a sensor that substantially overlaps the sensor outputting ri axially, to is an output of a sensor that substantially overlaps the sensor outputting ti axially, and bo is an output of a sensor that substantially overlaps the sensor outputting bi axially.

2. The rolling bearing device according to claim 1,
    wherein the second raceway member includes a wheel-attaching flange for attaching a wheel of a vehicle, and the first raceway member includes a body-attaching flange for attaching a body of the vehicle,
    wherein the raceway surface of the first raceway member is located radially outside the raceway surface of the second raceway member,
    wherein, in a state where the second raceway member is arranged in a predetermined position,
        a detection surface of the sensor outputting fi radially faces a portion of the displacement-detected portion that is located substantially on a front side of the vehicle,
        a detection surface of the sensor outputting ri radially faces a portion of the displacement-detected portion that is located substantially on a rear side of the vehicle,
        a detection surface of the sensor outputting ti radially faces a portion of the displacement-detected portion that is located substantially on a vertical top side of the vehicle, and
        a detection surface of the sensor outputting bi radially faces a portion of the displacement-detected portion that is located substantially on a vertical bottom side of the vehicle, and
    wherein the calculator calculates a translational load in a vertical direction of the vehicle, a translational load in a traveling direction of the vehicle, a translational load in an axial direction of the wheel, a moment load around the vertical direction of the vehicle, and a moment load around the traveling direction of the vehicle, based on fi−ri, ti−bi, fo −ro, to−ro, (fi+ri+ti+bi−(fo+ro+to+bo)) and twenty-five constants.

3. The rolling bearing device according to claim 1, wherein the second raceway member includes a wheel-attaching flange for attaching a wheel of a vehicle, and the first raceway member includes a body-attaching flange for attaching a body of the vehicle, wherein the raceway surface of the first raceway member is located radially outside the raceway surface of the second raceway member, wherein, in a state where the second raceway member is arranged in a predetermined position, a detection surface of the sensor outputting fi radially faces a portion of the displacement-detected portion that is located substantially on the front side of the vehicle, a detection surface of the sensor outputting ri radially faces a portion of the displacement-detected portion that is located substantially on the rear side of the vehicle, a detection surface of the sensor outputting ti radially faces a portion of the displacement-detected portion that is located substantially on the vertical top side of the vehicle, and a detection surface of the sensor outputting bi radially faces a portion of the displacement-detected portion that is located substantially on the vertical bottom side of the vehicle, and wherein the calculator calculates Fx, Fy, Fz, Mz and Mx based on (i) four values selected from [fi−ri, ti−bi, fo−ro, to−ro and (fi+ri+ti+bi−(fo+ro+to+bo))], (ii) sixteen constants, and (iii) a relational expression Fy=Mx/R, where a radius of the wheel is represented by R[m], a translational load in a vertical direction of the vehicle is represented by Fz[N], a translational load in a traveling direction of the vehicle is represented by Fx[N], a translational load in an axial direction of the wheel is represented by Fy[N], a moment load around the vertical direction of the vehicle is represented by Mz[N·m], and a moment load around the traveling direction of the vehicle is represented by Mx[N·m].

4. The rolling bearing device according to claim 1, wherein the sensor unit includes:

a rotation-signal extractor that extracts a rotational synchronization component included in the rotation of the second raceway member relative to the first raceway member based on each of a signal output by the first displacement detector and a signal output by the second displacement detector; and a displacement signal calculator that calculates a signal associated with the displacement of the displacement-detected portion based on an output of the first displacement detector, an output of the second displacement detector, and an output of the rotation-signal extractor.

5. The rolling bearing device according to claim 4, wherein the first displacement detector and the second displacement detector substantially axially overlap each other, and each of the first displacement detector and the second displacement detector includes four displacement sensors arranged at substantially regular intervals in the circumferential direction, wherein the sensor unit includes an orthogonal component calculator that calculates, based on a signal of the first displacement detector and a signal of the second displacement detector, a first displacement signal representing the displacement of the displacement-detected portion on a first axis that extends radially, and a second displacement signal representing the displacement of the displacement-detected portion on a second axis that is orthogonal to the first axis and extends radially, and wherein the rotation-signal extractor includes:

a first calculator that converts the first displacement signal and the second displacement signal into two signals in a first rotating coordinate system that rotates at the same rotational speed as the rotational speed of the second raceway member relative to the first raceway member, and that is composed of two axes that extend radially and are orthogonal to each other;

a second calculator that performs time integration on each of the two signals output by the first calculator to output two signals; and a third calculator that converts the two signals output by the second calculator into two signals in a second rotating coordinate system that rotates in a direction opposite to the first rotating coordinate system at same rotational speed as the first rotating coordinate system and that is composed of two axes that extend radially and are orthogonal to each other.

\* \* \* \* \*